(12) United States Patent
Iwadate et al.

(10) Patent No.: US 9,324,010 B2
(45) Date of Patent: Apr. 26, 2016

(54) IMAGE FORMING APPARATUS

(71) Applicant: CANON KABUSHIKI KAISHA, Tokyo (JP)

(72) Inventors: Shinnosuke Iwadate, Toride (JP); Keita Takahashi, Abiko (JP); Hiroto Nishihara, Tsukuba (JP); Hiromi Shimura, Toride (JP); Teruhito Kai, Kashiwa (JP); Kenzo Kumagai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/796,483

(22) Filed: Jul. 10, 2015

(65) Prior Publication Data

US 2016/0019443 A1    Jan. 21, 2016

(30) Foreign Application Priority Data

Jul. 15, 2014  (JP) ................................ 2014-144860

(51) Int. Cl.
*G06F 3/12* (2006.01)
*G06K 15/02* (2006.01)
*G06K 15/00* (2006.01)

(52) U.S. Cl.
CPC .......... *G06K 15/1803* (2013.01); *G06K 15/407* (2013.01)

(58) Field of Classification Search
None
See application file for complete search history.

(56) References Cited

U.S. PATENT DOCUMENTS

| | | | | |
|---|---|---|---|---|
| 4,351,602 A | * | 9/1982 | Yamada | H04N 1/29 355/1 |
| 4,408,861 A | * | 10/1983 | Hukuda | B65H 29/56 271/274 |
| 5,107,279 A | * | 4/1992 | Yamamoto | H04N 1/04 347/261 |
| 2003/0164971 A1 | * | 9/2003 | Kidani | H04N 1/46 358/1.13 |
| 2014/0016952 A1 | | 1/2014 | Matsuda et al. | |

OTHER PUBLICATIONS

Office Action dated Nov. 20, 2015, in UK Patent Application No. GB1512107.2.

* cited by examiner

*Primary Examiner* — Marcus T Riley
(74) *Attorney, Agent, or Firm* — Fitzpatrick, Cella, Harper & Scinto

(57) ABSTRACT

An image forming apparatus, including a mechanism configured to switch an intermediate transfer member between a first state in which the intermediate transfer member is in contact with a first photosensitive drum for a color toner image and a second photosensitive drum for a black toner image in a full-color mode and a second state in which the intermediate transfer member is separated from the first photosensitive drum and in contact with the second photosensitive drum in a monochrome mode; and a control portion configured to control the mechanism according to a set color mode in response to a user operation from which a start of the image formation is predicted, without an instruction of image formation and thereafter control the mechanism according to a changed color mode if the set color mode is changed by a setting of the color mode before receiving the instruction of the image formation.

10 Claims, 13 Drawing Sheets

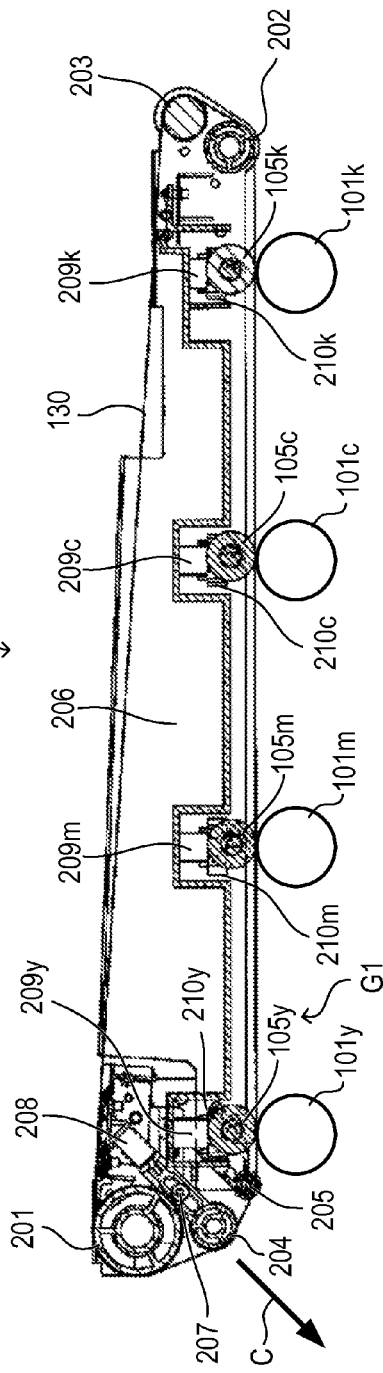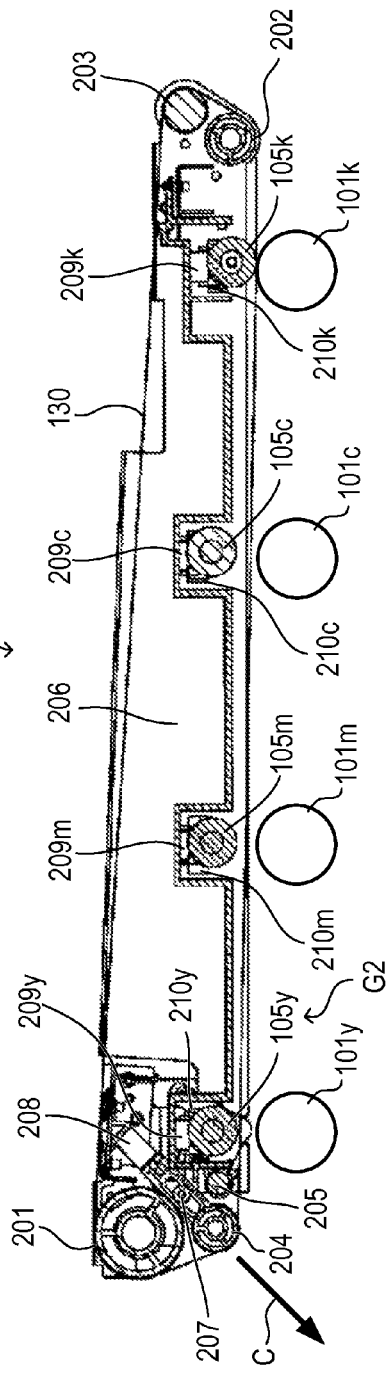

IMAGE FORMING APPARATUS

BACKGROUND OF THE INVENTION

1. Field of the Invention

The present invention relates to an image forming apparatus operable in a plurality of color modes.

2. Description of the Related Art

Hitherto, in an electrophotographic image forming apparatus, there has been demanded reduction in a first print out time from instruction of printing to output thereof, and in a first copy time from depression of a copy key to copy output. Further, as one method of the time reduction, there has been widely known a technology of performing an image formation preparing operation before the instruction of the printing or copying (image forming instruction) is input.

In U.S. Pat. No. 5,107,279, there is proposed a configuration in which, when an operation from which a start of image formation is predicted, such as an operation of an operating portion of the image forming apparatus and placement of an original on an original reading device, is detected, a motor for a rotary polygon mirror is started to be rotated prior to the image forming instruction. In general, a period of time from the start of the rotation of the motor for the rotary polygon mirror to stabilization of a rotation speed thereof is longer than that of a drive motor for an image bearing member or other motors required for the image formation. In view of the above, the motor for the rotary polygon mirror is started to be rotated prior to the image forming instruction, thereby being capable of reducing the period of time from the image forming instruction to the start of the image formation. With this, the image formation can be started in a shorter period of time after the image forming instruction without causing a user to wait for a long period of time from the start of the rotation of the motor for the rotary polygon mirror to the stabilization of the rotation speed thereof.

In recent years, the image forming apparatus has been operable in a monochrome mode for forming a monochrome image, and in a full-color mode for forming a full-color image.

However, in the related art, irrespective of a set color mode (monochrome mode or full-color mode), the same image formation preparing operation has been performed. Therefore, the conventional image forming apparatus may become disadvantageous from the viewpoint of the reduction in the first print out time and power saving.

SUMMARY OF THE INVENTION

In view of the above, the present invention has an object to provide an image forming apparatus which starts an image formation preparing operation in accordance with a set color mode.

According to one embodiment, there is provided an image forming apparatus, comprising: a first photosensitive drum on which a color toner image is to be formed; a second photosensitive drum on which a black toner image is to be formed; an intermediate transfer member onto which the color toner image and the black toner image are to be transferred; a transfer portion configured to transfer, onto a sheet, a toner image transferred on the intermediate transfer member; a fixing unit configured to fix, onto the sheet, the toner image transferred on the sheet; a mechanism configured to switch the intermediate transfer member between a first state in which the intermediate transfer member is in contact with the first photosensitive drum and the second photosensitive drum and a second state in which the intermediate transfer member is separated from the first photosensitive drum and in contact with the second photosensitive drum; an operating portion configured to receive a user instruction including an instruction of image formation and an instruction of setting of a color mode; a detection portion configured to detect a user operation from which a start of the image formation is predicted; and a control portion configured to: control, in response to detection of the user operation by the detection portion, the mechanism in accordance with the set color mode without waiting to receive the instruction of the image formation; and start the image formation in response to the instruction of the image formation, wherein the color mode includes a full-color mode and a monochrome mode, and wherein the control portion is configured to: control the mechanism so that the intermediate transfer member is put into the first state when the full-color mode is set; control the mechanism so that the intermediate transfer member is put into the second state when the monochrome mode is set; and control, when the color mode is changed in response to the instruction of the setting of the color mode before receiving the instruction of the image formation and after controlling the mechanism in accordance with the set color mode, the mechanism in accordance with the changed color mode.

Further features of the present invention will become apparent from the following description of exemplary embodiments with reference to the attached drawings.

BRIEF DESCRIPTION OF THE DRAWINGS

FIG. 4A is a sectional view of an intermediate transfer unit in a full-color mode.

FIG. 4B is a sectional view of the intermediate transfer unit in a monochrome mode.

DESCRIPTION OF THE EMBODIMENTS

Preferred embodiments of the present invention will now be described in detail in accordance with the accompanying drawings.

Now, an embodiment of the present invention will be described.

<Image Forming System>

Figure 1:
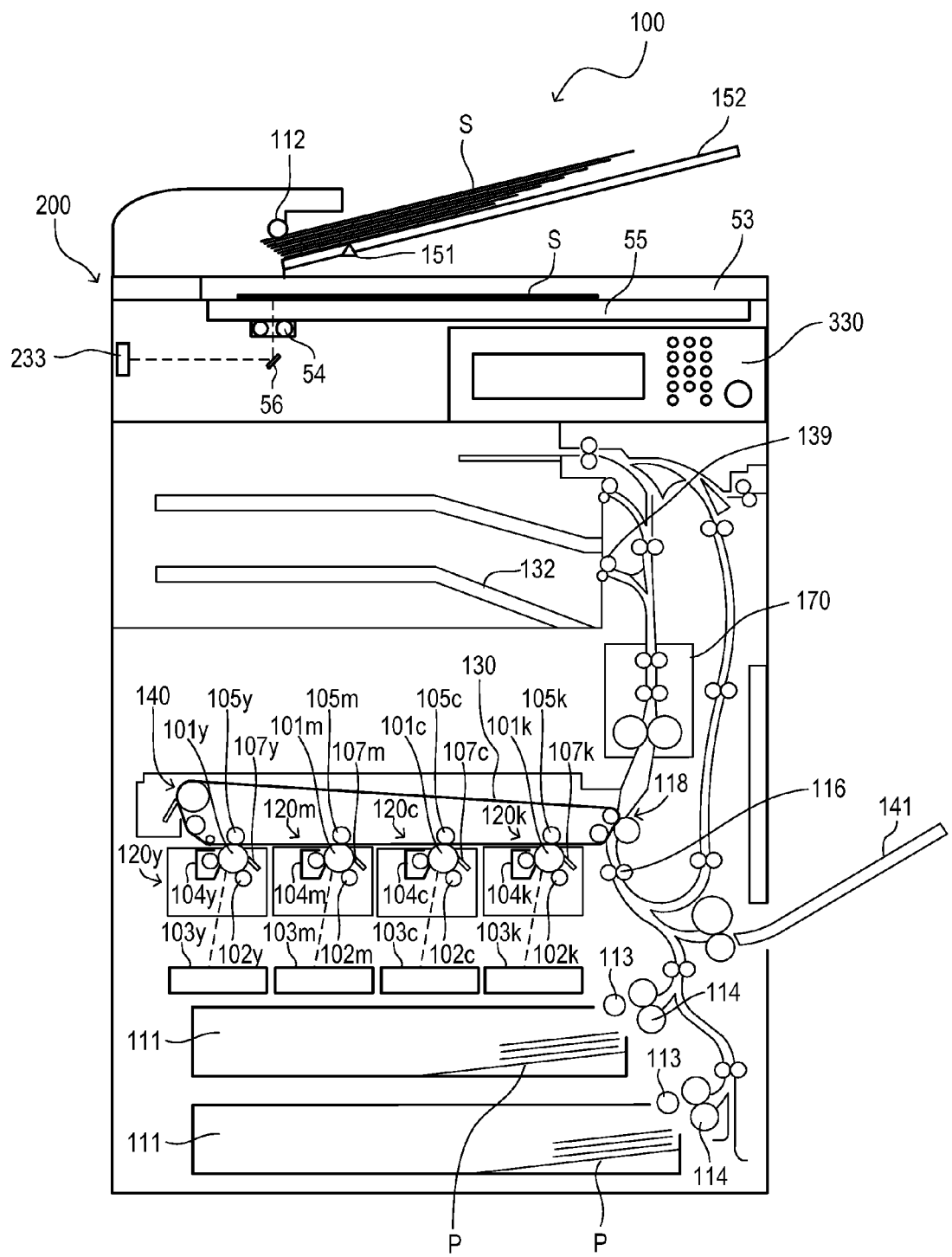
FIG. 1 is a sectional view of an image forming apparatus according to an embodiment.
Figure 2:
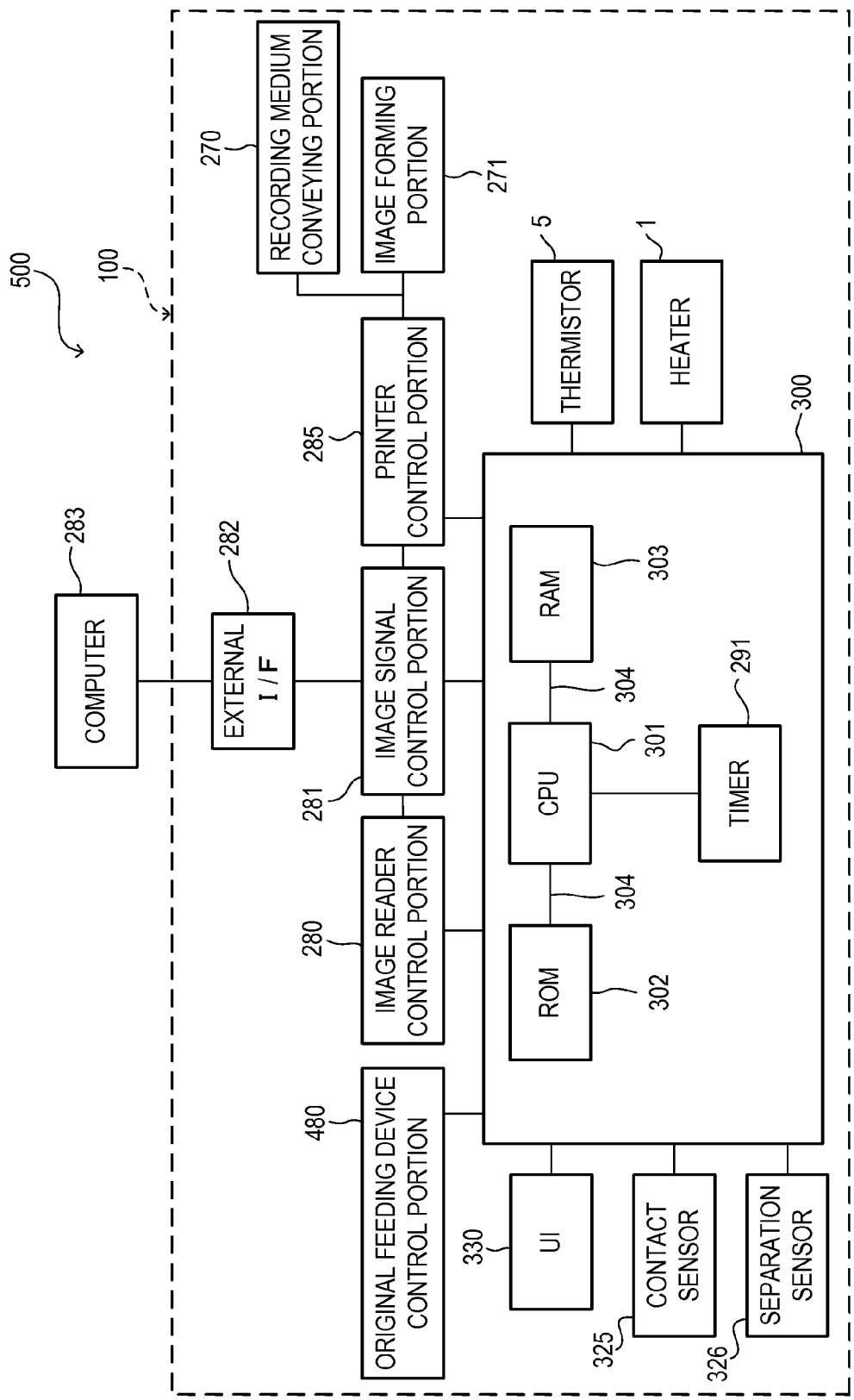
FIG. 2 is a block diagram of an image forming system according to the embodiment.

An image forming system 500 includes an image forming apparatus 100 and a computer 283. FIG. 1 is a sectional view of the image forming apparatus 100 according to the embodiment. FIG. 2 is a block diagram of the image forming system 500 according to the embodiment. Referring to FIG. 1 and FIG. 2, the image forming apparatus 100 will be described.

[Image Forming Apparatus]

The image forming apparatus 100 is operable in a monochrome mode for forming a monochrome image (single-color image) and a full-color mode for forming a full-color image (color image). The image forming apparatus 100 switches an image formation preparing operation in accordance with a set color mode, thereby being capable of performing the image formation preparing operation appropriate for reduction in a first print out time and power saving.

The image forming apparatus 100 includes an original reading portion 200 in an upper portion thereof. The original reading portion 200 includes an original tray 152, an original sensor 151, an original conveying roller 112, an original feeding device control portion 480, an original glass plate 55, lamps (light sources) 54, a reflection mirror 56, an image sensor 233, and an image reader control portion 280. The original reading portion 200 includes an original pressure cover 53 for pressing down an original S, which is placed on the original glass plate 55 for reading the original.

As illustrated in FIG. 2, the image forming apparatus 100 includes a control portion 300. The control portion 300 includes a CPU (control circuit) 301, a ROM (storage device) 302, a RAM (storage device) 303, and a timer (clocking device) 291.

The CPU 301 is a central processing unit configured to perform system control of the image forming apparatus 100. The CPU 301 is connected to each of the ROM 302 and the RAM 303 through buses 304 such as an address bus and a data bus. The ROM 302 stores a control program. The RAM 303 stores variables to be used for the control and image data to be read by the image sensor 233. The CPU 301 is connected to the timer 291. The timer 291 counts time and outputs a count value (hereinafter referred to as "timer value") to the CPU 301. The CPU 301 acquires and clears the timer value of the timer 291.

Via the original feeding device control portion 480, the CPU 301 drives the original conveying roller 112, and detects presence or absence of the originals S on the original tray 152 via the original sensor 151, which are illustrated in FIG. 1. Further, via the image reader control portion 280, the CPU 301 detects an opening/closing operation for the original pressure cover 53, and reads an image of the original S on the original glass plate 55 via the image sensor 233. The image forming apparatus 100 can perform fixed-reading for the image of the original S placed on the original glass plate 55 and flow-reading for the images of the originals S conveyed from the original tray 152 to the original glass plate 55 by the original conveying roller 112. An analog image signal output from the image sensor 233 is transferred to an image signal control portion 281.

In a copying operation, the image signal control portion 281 converts the analog image signal output from the image sensor 233 into a digital image signal. After that, the image signal control portion 281 performs various kinds of processing on the digital image signal, and then converts the digital image signal into a video signal to output the video signal to a printer control portion 285. Further, in an image forming operation, the image signal control portion 281 performs various kinds of processing on a digital image signal input from the computer 283 via an external I/F 282, and then converts the digital image signal into a video signal to output the video signal to the printer control portion 285. The printer control portion 285 instructs an image forming portion 271 to perform image formation in accordance with an instruction from the CPU 301. The image forming portion 271 drives image forming units 120 in accordance with the video signal from the printer control portion 285. Further, the printer control portion 285 controls a recording medium conveying portion 270 in accordance with the instruction from the CPU 301, to thereby feed and convey a recording medium P.

A user interface (hereinafter referred to as "UI") 330 is an operating portion for a user to operate the image forming apparatus 100. The user sets image forming conditions through the UI 330. The image forming conditions include a plurality of color modes such as the monochrome mode for forming a monochrome image, the full-color mode for forming a full-color image, and a full-color/monochrome automatically discriminating mode. Further, the image forming conditions include an enlargement/reduction factor, sheet selection, image density setting, one-sided or two-sided printing, the number of copies, and the like. Through the UI 330, the user can set (select) the color mode for performing the image formation and instruct to start copying. The CPU 301 stores the color mode set through the UI 330 in the RAM 303. The UI 330 can also display a state of the image forming apparatus 100.

[Image Forming Operation]

Next, referring to FIG. 1 and FIG. 2, the image forming operation for the image forming apparatus 100 will be described. The CPU 301 functions as an image formation start predictive operation detection portion configured to detect an operation from which a start of the image formation is predicted. Even before the user depresses a start key 306 of the UI 330, the CPU 301 starts, in response to the detection of the user operation from which the start of the image formation is predicted, the image formation preparing operation in accordance with the set color mode without waiting for an image forming instruction. In the embodiment, the operation from which the start of the image formation is predicted includes a key operation for the UI (operating portion) 330, the placement of the original S on the original glass plate 55, the placement of the originals S on the original tray 152, and the opening/closing operation for the original pressure cover 53. However, the operation from which the start of the image formation is predicted is not limited thereto. The operation from which the start of the image formation is predicted may be, for example, an opening/closing operation for a sheet feeding cassette 111 or placement of the recording media P on a manual feeding tray 141.

The key operation for the UI 330 is, for example, print settings such as setting of the color mode in the UI 330 by the user and setting of the number of copies. The CPU 301 detects the key operation for the UI 330 performed by the user. The CPU 301 detects the placement of the originals S on the original tray 152 via the original feeding device control portion 480. The CPU 301 detects the opening/closing operation for the original pressure cover 53 and the placement of the original S on the original glass plate 55 via the image reader control portion 280. When the CPU 301 detects the operation from which the start of the image formation is predicted, the CPU 301 starts the image formation preparing operation. In the image formation preparing operation, the CPU 301 starts a fixing temperature controlling operation for a fixing device 170, and performs a contact-separation operation for an intermediate transfer unit 140 in accordance with the color mode set through the UI 330 as well. In the contact-separation operation, the CPU 301 switches a contact state and a separation state of the intermediate transfer unit 140 in accordance with the set color mode. The image formation preparing operation for the image forming apparatus 100, the fixing temperature controlling operation for the fixing device 170, and the contact-separation operation for the intermediate transfer unit 140 will be described later in detail.

When the image forming instruction is received, the CPU 301 starts the image formation. In the embodiment, when the start key 306 (FIG. 3A) of the UI 330 for starting the copying operation is depressed, the CPU 301 receives the image forming instruction from the UI 330. Further, when the user instructs the image forming apparatus 100 on the computer 283 to perform printing, the CPU 301 may receive the image forming instruction via the external I/F 282.

When the image forming instruction is received from the UI 330, the CPU 301 controls the original feeding device control portion 480 and the image reader control portion 280 to start reading the originals S. The CPU 301 drives the original conveying roller 112 to convey the originals S from the original tray 152 onto the original glass plate 55, and causes light to be radiated to the original glass plate 55 from the lamps (light sources) 54 as well. The light reflected from the originals S is guided to the image sensor 233 by the reflection mirror 56. The image data of the originals S read by the image sensor 233 is output to the image signal control portion 281. The image data is stored in the RAM 303 of the control portion 300. The original reading operation is continued until the reading of the original S on the original glass plate 55 is completed, or the reading of the final original detected by the original sensor 151 is completed.

On the other hand, when the CPU 301 detects the operation from which the start of the image formation is predicted, the CPU 301 switches the intermediate transfer unit 140 to the contact state or the separation state in accordance with the color mode. Thus, in the embodiment, by the time the CPU 301 receives the image forming instruction from the UI 330, the switching of the intermediate transfer unit 140 to the contact state or the separation state is completed. When the image forming instruction is received from the UI 330, the CPU 301 controls the image forming units 120$y$, 120$m$, 120$c$, and 120$k$ via the image forming portion 271, to thereby start the image formation in accordance with the image data stored in the RAM 303. Note that, suffixes y, m, c, and k in the reference symbols represent configurations corresponding to yellow, magenta, cyan, and black, respectively. For example, the image forming units 120$y$, 120$m$, 120$c$, and 120$k$ represent the yellow image forming unit 120$y$, the magenta image forming unit 120$m$, the cyan image forming unit 120$c$, and the black image forming unit 120$k$, respectively.

The image forming units 120$y$, 120$m$, 120$c$, and 120$k$ include photosensitive drums (photosensitive members) 101$y$, 101$m$, 101$c$, and 101$k$, developing devices 104$y$, 104$m$, 104$c$, and 104$k$, charging rollers 102$y$, 102$m$, 102$c$, and 102$k$, and photosensitive drum cleaners 107$y$, 107$m$, 107$c$, and 107$k$, respectively. The charging rollers (charging members) 102 uniformly charge surfaces of the photosensitive drums 101. Light scanning devices (exposure devices) 103 emit light beams, which are modulated in accordance with the image data, to the uniformly charged surfaces of the photosensitive drums 101, thereby forming electrostatic latent images on the photosensitive drums 101. The developing devices 104 develop the electrostatic latent images on the photosensitive drums 101 with toners of the respective colors, thereby forming toner images of the respective colors. In the monochrome mode, a black toner image is formed only on the black photosensitive drum 101$k$. A primary transfer roller 105$k$ transfers the black toner image on the photosensitive drum 101$k$ onto an intermediate transfer belt (intermediate transfer member) 130. In the full-color mode, a yellow toner image, a magenta toner image, a cyan toner image, and a black toner image are formed on the photosensitive drums 101$y$, 101$m$, 101$c$, and 101$k$, respectively. Primary transfer rollers 105$y$, 105$m$, 105$c$, and 105$k$ transfer the toner images on the photosensitive drums 101$y$, 101$m$, 101$c$, and 101$k$ sequentially onto the intermediate transfer belt 130 in a superimposed manner. The toner images transferred onto the intermediate transfer belt 130 reach a secondary transfer portion 118 through the rotation of the intermediate transfer belt 130.

The CPU 301 drives a motor (not shown) as a drive source for each of pickup rollers 113, feed rollers 114, registration rollers 116, and delivery rollers 139 via the recording medium conveying portion 270. The pickup rollers 113 introduce the recording media P from the sheet feeding cassettes 111 to the feed rollers 114. The feed rollers 114 feed the recording media P to the registration rollers 116 one by one. The registration rollers 116 convey the recording medium P to the secondary transfer portion 118 in synchronization with the toner images on the intermediate transfer belt 130. In the secondary transfer portion 118, the toner images on the intermediate transfer belt 130 are transferred onto the recording medium P.

The recording medium P having the toner images transferred thereonto is conveyed to the fixing device 170. The fixing device 170 heats and pressurizes the recording medium P, to thereby fix the toner images onto the recording medium P. With this, an image is formed on the recording medium P. The recording medium P having the image formed thereon is delivered onto a delivery tray 132 by the delivery rollers 139.

Note that, the above-mentioned image forming apparatus and image forming operation are taken as an example. The present invention is not limited to the above-mentioned image forming apparatus and image forming operation.

<Color Mode of Image Forming Apparatus>

[Setting of Color Mode Through Operating Portion]

Figure 3A:
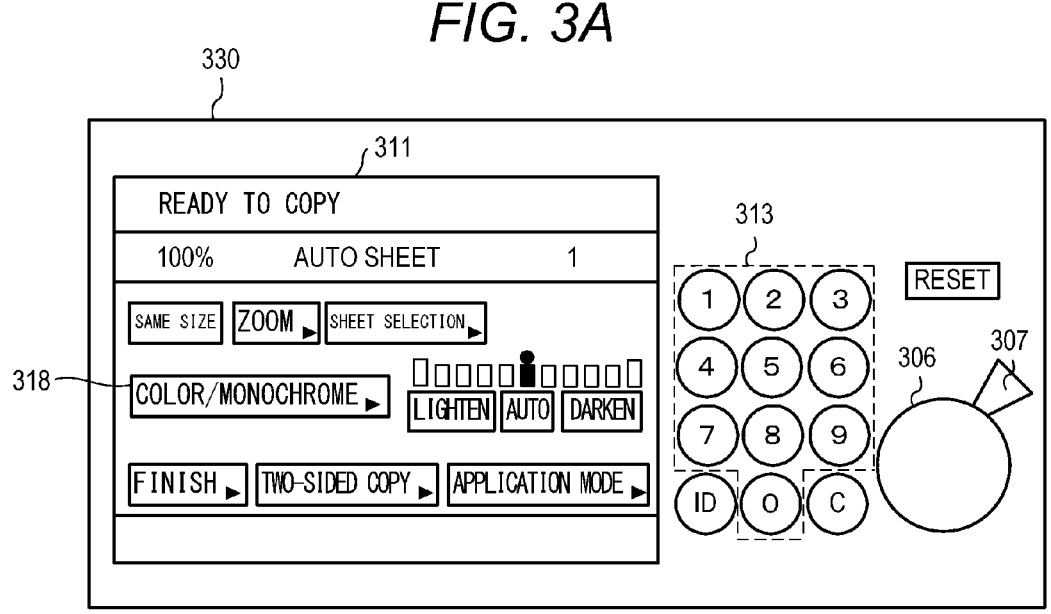
FIG. 3A is a front view of a UI according to the embodiment.
Figure 3B:
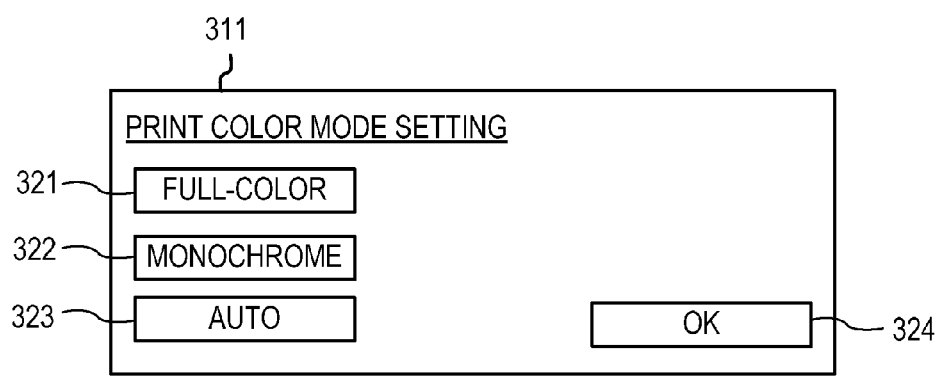
FIG. 3B is a view of a screen for setting a print color mode.
Figure 3C:
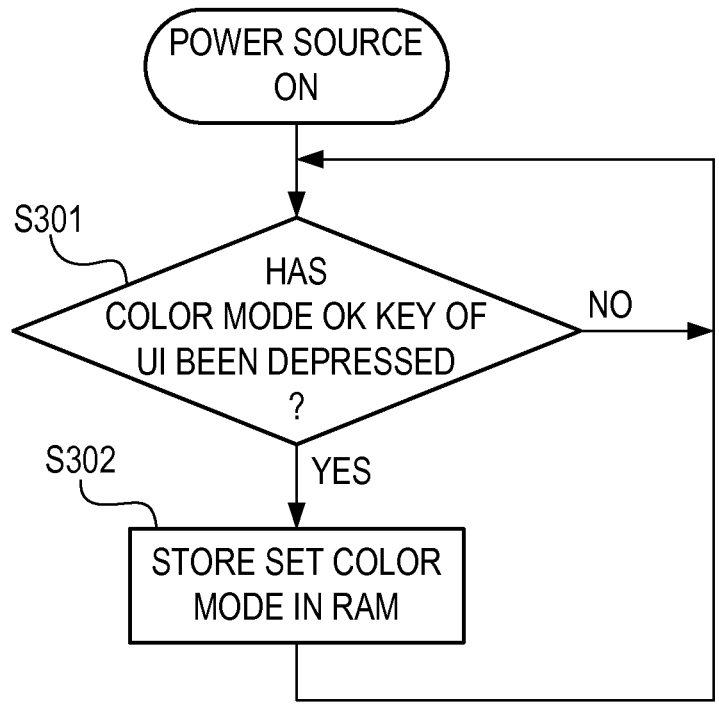
FIG. 3C is a flowchart of an operation of storing a color mode set through the UI in a RAM.

FIG. 3A, FIG. 3B, and FIG. 3C are views of the UI (operating portion) 330 according to the embodiment. FIG. 3A is a front view of the UI 330 according to the embodiment. On the UI 330, the start key 306 for starting the copying operation, a stop key 307 for interrupting the copying operation, and numerical keys 313 for performing numeric settings are arranged. Further, a display portion 311 formed of a touch panel is arranged in an upper portion of the UI 330. The display portion 311 can create soft keys on its screen. When a "color/monochrome" soft key 318 displayed on the display portion 311 is depressed by the user, a screen for setting a print color mode appears on the display portion 311.

FIG. 3B is a view of the screen for setting the print color mode. The screen for setting the print color mode (hereinafter referred to as "color mode") displays a full-color mode key 321, a monochrome mode key 322, a full-color/monochrome automatically discriminating mode key 323, and a color mode OK key 324. The full-color mode key 321 is a key for selecting the formation of the full-color image. The monochrome mode key 322 is a key for selecting the formation of the monochrome image. The full-color/monochrome automatically discriminating mode key 323 is a key for automatically discriminating whether the original S is a color original or a monochrome original and selecting the formation of the image in a color mode in accordance with the discrimination results. The color mode OK key 324 is a key for setting the color mode selected by the user in the UI 330. The user selects the full-color mode key 321, the monochrome mode key 322, or the full-color/monochrome automatically discriminating mode key 323 and depresses the color mode OK key 324, to thereby set the color mode of the image forming apparatus 100. Further, the CPU 301 starts the image formation preparing operation in accordance with the key operation for the UI 330 and the setting of the color mode.

FIG. 3C is a flowchart of an operation of storing the color mode set through the UI 330 in the RAM 303. Under a state in which a power source is turned ON, the CPU 301 constantly detects the key operation for the UI 330 and a set value that is set through the key operation. When the color mode OK key 324 is depressed (S301), the CPU 301 stores the set color mode in the RAM 303 (S302). In the embodiment, the color mode is set through the UI 330. However, for example, the color mode may be set by the computer 283 via the external I/F 282.

In the embodiment, in the image formation preparing operation, the contact-separation operation for switching the contact state and the separation state of the intermediate transfer unit 140 can be performed in accordance with the set color mode. In the embodiment, in the image formation preparing operation, the fixing temperature controlling operation for changing an image formation preparing temperature of the fixing device 170 in accordance with the set color mode can be performed. The contact-separation operation for the intermediate transfer unit 140 and the fixing temperature controlling operation for the fixing device 170 in the image formation preparing operation will be described.

[Contact-Separation Operation for Intermediate Transfer Unit]

Next, the contact-separation operation for the intermediate transfer unit 140 in the image formation preparing operation will be described. In the contact-separation operation, the contact state and the separation state between the intermediate transfer belt 130 and the photosensitive drums 101 can be switched in accordance with the full-color mode and the monochrome mode.

(Photosensitive Drum and Intermediate Transfer Belt)

FIG. 4A and FIG. 4B are sectional views of the intermediate transfer unit 140 according to the embodiment. FIG. 4A is a sectional view of the intermediate transfer unit 140 in the full-color mode. FIG. 4B is a sectional view of the intermediate transfer unit 140 in the monochrome mode. As illustrated in FIG. 4A, the intermediate transfer belt 130 is stretched around a drive roller 201, an idler roller 202, a secondary transfer inner roller 203, a tension roller 204, and an auxiliary roller 205. The drive roller 201 is rotated by an intermediate transfer belt motor (not shown). The intermediate transfer belt 130 is rotated through the rotation of the drive roller 201. The drive roller 201, the idler roller 202, and the secondary transfer inner roller 203 are rotatably supported by a frame 206 of the intermediate transfer unit 140. Both end portions of the tension roller 204 are rotatably supported by a bearing 207 movable in a direction indicated by the arrow C in FIG. 4A and FIG. 4B with respect to the frame 206. The bearing 207 is biased by a spring 208, thereby being movable in the direction indicated by the arrow C. With this, the tension roller 204 applies a substantially constant tensile force to the intermediate transfer belt 130.

The primary transfer rollers 105y, 105m, 105c, and 105k are arranged so as to be opposed to the photosensitive drums 101y, 101m, 101c, and 101k across the intermediate transfer belt 130, respectively. Both ends of each of the primary transfer rollers 105y, 105m, 105c, and 105k are rotatably supported by bearing 210y, 210m, 210c, and 210k, respectively. The bearings 210y, 210m, 210c, 210k are movably guided in one direction (vertical direction in FIG. 4A and FIG. 4B) by the frame 206. The bearings 210y, 210m, 210c, and 210k are biased toward the photosensitive drums 101y, 101m, 101c, and 101k by springs 209y, 209m, 209c, and 209k, respectively. The photosensitive drums 101y, 101m, 101c, and 101k are driven by respective drum motors (not shown).

In the full-color mode, the image formation of all the colors is required. Thus, in the full-color mode, as illustrated in FIG. 4A, the primary transfer rollers 105y, 105m, 105c, and 105k cause the intermediate transfer belt 130 to be brought into contact with the photosensitive drums 101y, 101m, 101c, and 101k. A state in which the intermediate transfer belt 130 is brought into contact with the photosensitive drums 101y, 101m, 101c, and 101k (full-color photosensitive drums) is hereinafter referred to as "contact state".

In the monochrome mode, only the black image formation is performed. Thus, in the monochrome mode, as illustrated in FIG. 4B, the yellow, magenta, and cyan primary transfer rollers 105y, 105m, and 105c cause the intermediate transfer belt 130 to be separated from the photosensitive drums 101y, 101m, and 101c. The respective drum motors (not shown) configured to drive the separated photosensitive drums 101y, 101m, and 101c are also stopped. As illustrated in FIG. 4B, the primary transfer rollers 105y, 105m, and 105c and the auxiliary roller 205 are retreated upward to be out of contact with the intermediate transfer belt 130. Further, the intermediate transfer belt 130 is also out of contact with the yellow, magenta, and cyan photosensitive drums 101y, 101m, and 101c. Only the black primary transfer roller 105k is brought into contact with the black photosensitive drum 101k through intermediation of the intermediate transfer belt 130. A state in which the intermediate transfer belt 130 is brought into contact only with the photosensitive drum 101k (monochrome photosensitive drum) to be separated from the photosensitive drums 101y, 101m, and 101c is hereinafter referred to as "separation state".

(Contact-Separation Mechanism)

Next, referring to FIG. 5A, FIG. 5B, FIG. 6A, FIG. 6B, FIG. 6C, FIG. 6D, FIG. 6E, FIG. 7A, and FIG. 7B, a contact-separation mechanism 400 configured to switch the contact state and the separation state of the intermediate transfer unit 140 will be described.

Figure 5A:
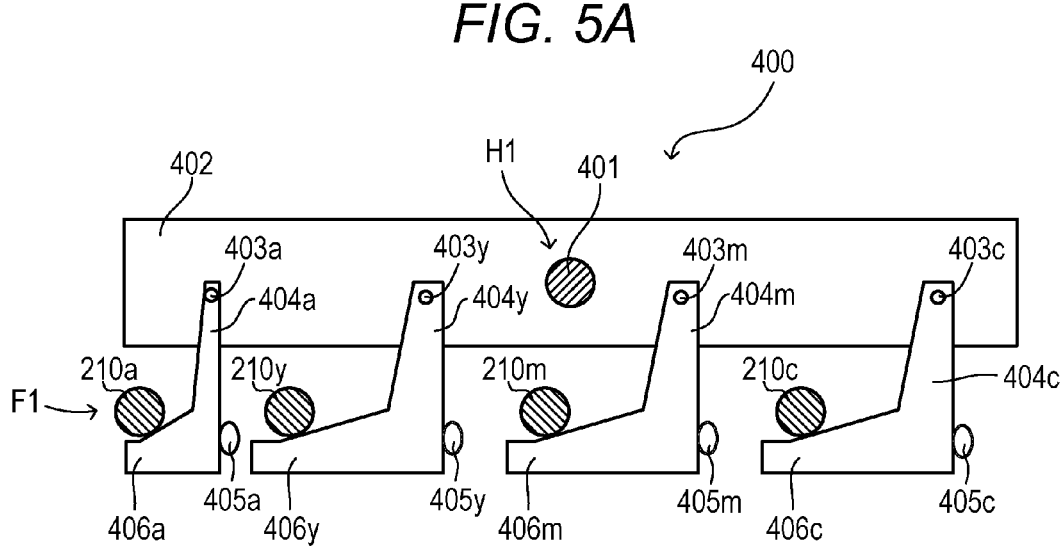
FIG. 5A is a sectional view of a contact-separation mechanism under a state in which the intermediate transfer unit is in a contact state.
Figure 5B:
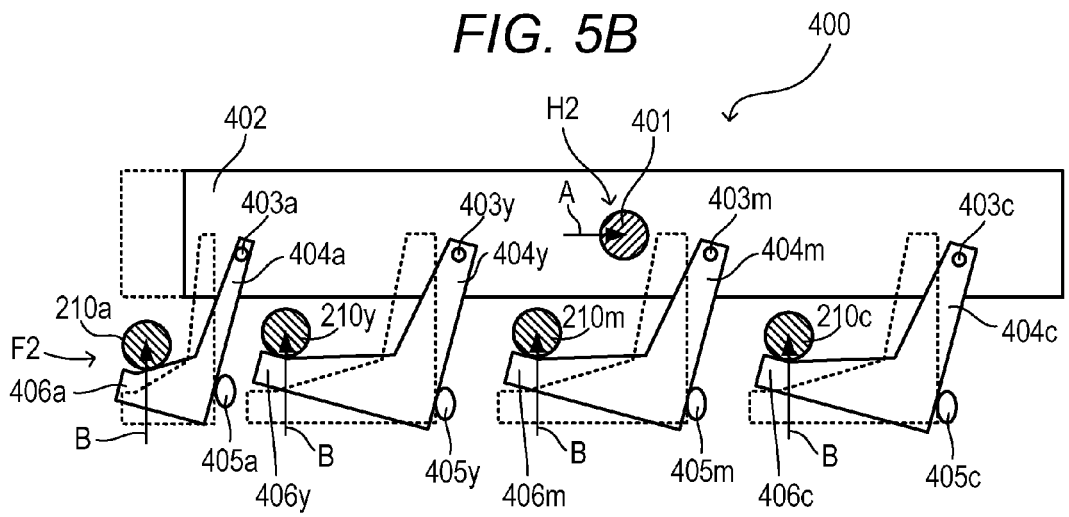
FIG. 5B is a sectional view of the contact-separation mechanism under a state in which the intermediate transfer unit is in a separation state.

FIG. 5A and FIG. 5B are sectional views of the contact-separation mechanism 400. FIG. 5A is an illustration of the contact-separation mechanism 400 under a state in which the intermediate transfer unit 140 is in the contact state. FIG. 5B is an illustration of the contact-separation mechanism 400 under a state in which the intermediate transfer unit 140 is in the separation state. The contact-separation mechanism 400 is configured to switch the contact state in which the intermediate transfer belt 130 is brought into contact with all the photosensitive drums 101y, 101m, 101c, and 101k, and the separation state in which the intermediate transfer belt 130 is brought into contact only with one photosensitive drum 101k to be separated from the photosensitive drums 101y, 101m, and 101c.

The contact-separation mechanism 400 includes a moving member (sliding member) 402 movable in a direction in which the image forming units 120y, 120m, 120c, and 120k are arrayed in a row (direction indicated by the arrow A in FIG. 5B). FIG. 5A is an illustration of the contact-separation mechanism 400 before the moving member 402 is moved. FIG. 5B is an illustration of the contact-separation mechanism 400 after the moving member 402 is moved in the direction indicated by the arrow A. An operation of the contact-separation mechanism 400 through the movement of the moving member 402 will be described later.

First, referring to FIG. 5A and FIG. 5B, a structure of the contact-separation mechanism 400 will be described. As illustrated in FIG. 5A, a lever member 401 is fixed to the moving member 402. Lift arms 404y, 404m, and 404c support the bearings 210y, 210m, and 210c of the yellow, magenta, and cyan primary transfer rollers 105y, 105m, and 105c from below, respectively. A lift arm 404a supports a bearing 210a of the auxiliary roller 205 from below. The lift arms 404a, 404y, 404m, and 404c are rotatably supported by arm shafts 403a, 403y, 403m, and 403c on the moving member 402, respectively. Lift arm support portions 405a, 405y, 405m, and 405c are arranged in vicinities of the lift arms 404a, 404y, 404m, and 404c, respectively. The lift arms 404a, 404y, 404m, and 404c are capable of being brought into contact with the lift arm support portions 405a, 405y, 405m, and 405c, respectively. End portions 406a, 406y, 406m, and 406c of the lift arms 404a, 404y, 404m, and 404c support the bearing 210a of the auxiliary roller 205 and the bearings 210y, 210m, and 210c of the primary transfer rollers 105y, 105m, and 105c, respectively.

Figure 6A:
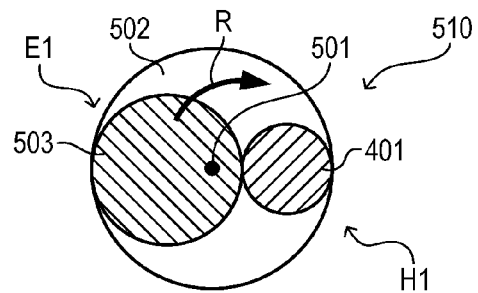
FIGS. 6A, 6B, 6C, 6D, and 6E are views of a cam structure configured to move a moving member according to the embodiment.

FIG. 6A, FIG. 6B, FIG. 6C, FIG. 6D, and FIG. 6E are views of a cam structure 510 configured to move the moving member 402 according to the embodiment. As illustrated in FIG. 5B, the cam structure 510 moves the moving member 402 in the direction indicated by the arrow A (horizontal direction in FIG. 5B). As illustrated in FIG. 6A, the lever member 401 fixed to the moving member 402 is arranged in contact with a cam portion 503 of a gear 502. The gear 502 is rotated by a contact-separation motor (drive device) 504 (FIG. 7A and FIG. 7B) in a direction indicated by the arrow R about a cam shaft 501.

In FIG. 6A, the cam portion 503 is located at a position E1 at which the cam portion 503 does not interfere with any part of the lever member 401. When the cam portion 503 is located at the position E1, the lever member 401 is located at a left-end position H1. When the lever member 401 is located at the left-end position H1, as illustrated in FIG. 5A, the bearings 210a, 210y, 210m, and 210c are located at lower positions F1. When the bearings 210a, 210y, 210m, and 210c are located at the lower positions F1, the yellow, magenta, and cyan primary transfer rollers 105y, 105m, and 105c and the auxiliary roller 205 are located at lower positions G1 as illustrated in FIG. 4A. The primary transfer rollers 105y, 105m, 105c, and 105k are brought into contact with the photosensitive drums 101y, 101m, 101c, and 101k through intermediation of the intermediate transfer belt 130, respectively. Specifically, the intermediate transfer belt 130 is in the contact state in which the intermediate transfer belt 130 is brought into contact with the photosensitive drums 101y, 101m, 101c, and 101k (full-color photosensitive drums).

Figure 7A:
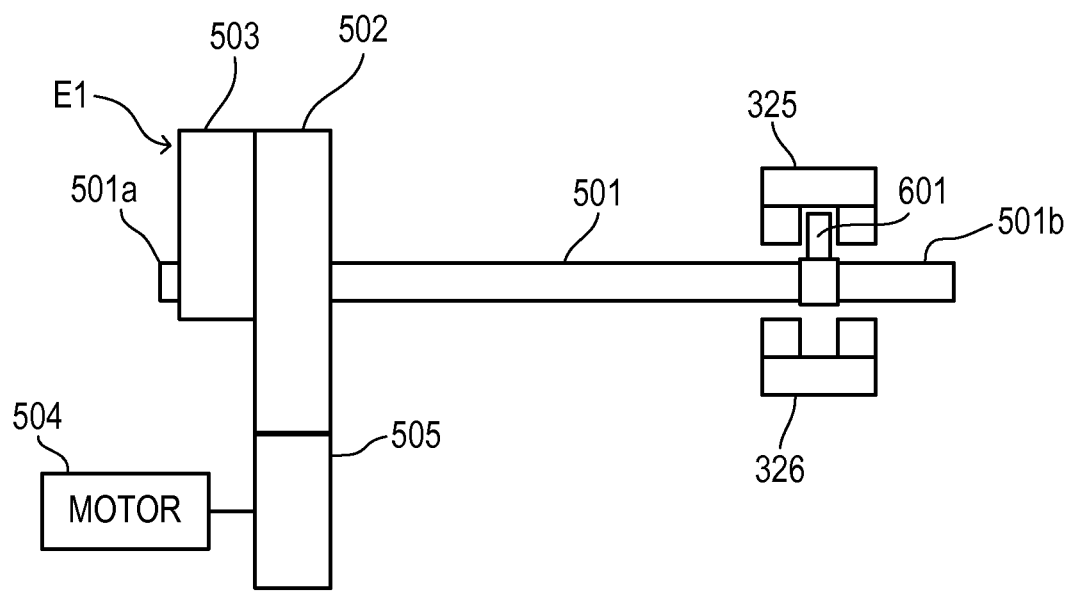
FIGS. 7A and 7B are plan views of a gear, a cam portion, and a cam shaft according to the embodiment.
Figure 7B:
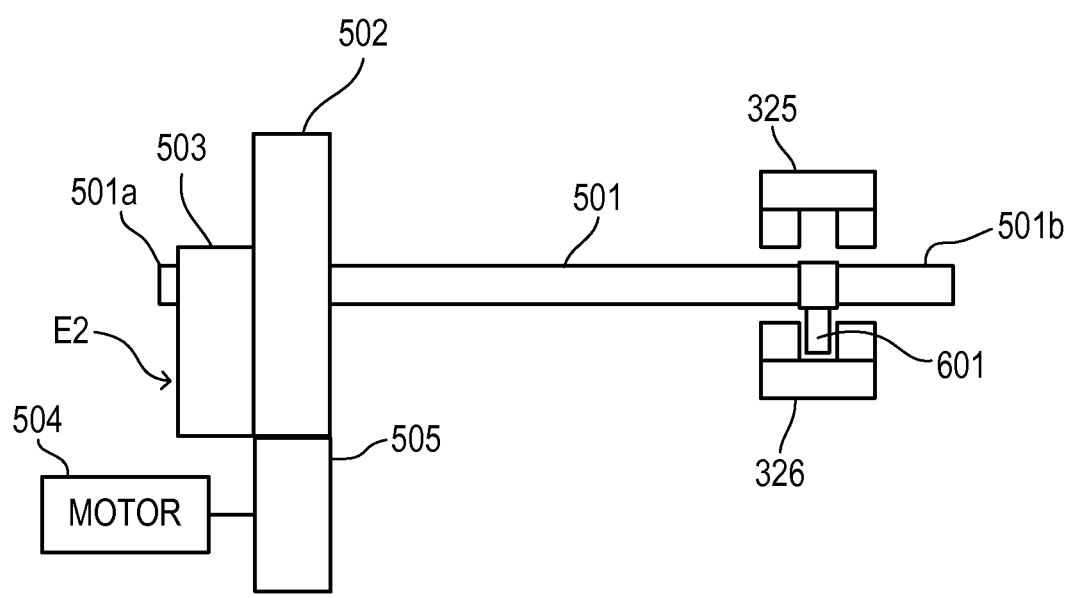

FIG. 7A and FIG. 7B are plan views of the gear 502, the cam portion 503, and the cam shaft 501 according to the embodiment. As illustrated in FIG. 7A and FIG. 7B, the gear 502 and the cam portion 503 are fixed to the cam shaft 501 at one end portion 501a. A contact-separation detection flag 601 is fixed to the cam shaft 501 at another end portion 501b. A contact sensor 325 and a separation sensor 326 are arranged around the contact-separation detection flag 601 so as to be opposed to each other. As illustrated in FIG. 2, the contact sensor 325 and the separation sensor 326 are electrically connected to the CPU 301 of the control portion 300. The contact-separation motor 504 rotates the gear 502 through intermediation of a gear train 505. The gear 502 is rotated integrally with the cam portion 503, the cam shaft 501, and the contact-separation detection flag 601. FIG. 7A is an illustration of the contact-separation detection flag 601 when the cam portion 503 is located at the position E1. The contact-separation detection flag 601 blocks light of the contact sensor 325. Specifically, the CPU 301 determines that the contact-separation mechanism 400 is in the contact state.

Figure 6B:
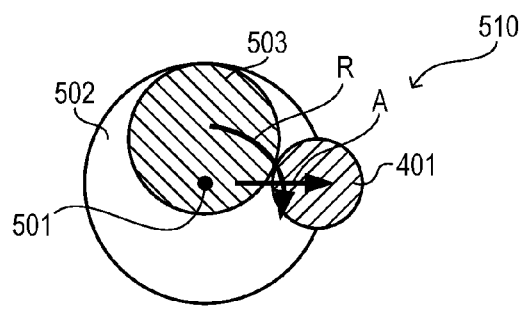

When the contact-separation motor 504 is further driven from the state illustrated in FIG. 6A, the state illustrated in FIG. 6B is obtained. FIG. 6B is an illustration of a state in which the gear 502 is rotated by the contact-separation motor 504 in the direction indicated by the arrow R by 90° from the state of FIG. 6A. As illustrated in FIG. 6B, the cam portion 503 pushes the lever member 401 in the direction indicated by the arrow A through the rotation of the gear 502.

Figure 6C:
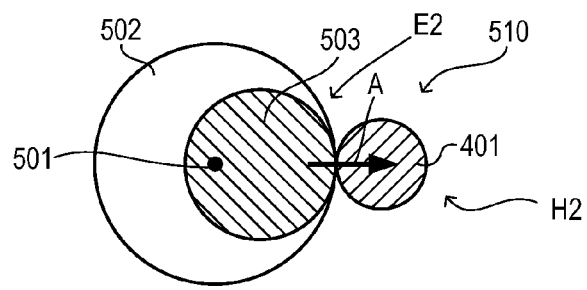

When the contact-separation motor 504 is further driven from the state illustrated in FIG. 6B, the state illustrated in FIG. 6C is obtained. FIG. 6C is an illustration of a state in which the gear 502 is rotated by the contact-separation motor 504 in the direction indicated by the arrow R by 180° from the state of FIG. 6A. As illustrated in FIG. 6C, the cam portion 503 is rotated together with the gear 502 to be located at a position E2. When the cam portion 503 is located at the position E2, the cam portion 503 pushes the lever member 401 to a farthest position in the direction indicated by the arrow A. Specifically, the lever member 401 is located at a right-end position H2. When the lever member 401 is located at the right-end position H2, as illustrated in FIG. 5B, the moving member 402 is located at a farthest position in the direction indicated by the arrow A.

Through the movement of the moving member 402, the moving member 402 applies a force to each of the arm shafts 403a, 403y, 403m, and 403c of the lift arms 404a, 404y, 404m, and 404c. The lift arms 404a, 404y, 404m, and 404c are rotated about the lift arm support portions 405a, 405y, 405m, and 405c as fulcrums with the arm shafts 403a, 403y, 403m, and 403c as power points. The end portions 406a, 406y, 406m, and 406c of the lift arms 404a, 404y, 404m, and 404c as action points raise the bearing 210a of the auxiliary roller 205 and the bearings 210y, 210m, and 210c of the primary transfer rollers 105y, 105m, and 105c in a direction indicated by the arrow B. As illustrated in FIG. 5B, the bearings 210a, 210y, 210m, and 210c are moved to upper positions F2. Accordingly, the yellow, magenta, and cyan primary transfer rollers 105y, 105m, and 105c and the auxiliary roller 205 are pushed upward to be moved to upper positions G2 as illustrated in FIG. 4B. The primary transfer rollers 105y, 105m, and 105c are out of contact with the photosensitive drums 101y, 101m, and 101c through intermediation of the intermediate transfer belt 130. Specifically, the intermediate transfer belt 130 is brought into contact only with the photosensitive drum 101k (monochrome photosensitive drum) to be put into the separation state in which the intermediate transfer belt 130 is separated from the photosensitive drums 101y, 101m, and 101c.

FIG. 7B is an illustration of the contact-separation detection flag 601 when the cam portion 503 is located at the position E2. The contact-separation detection flag 601 blocks light of the separation sensor 326. Specifically, the CPU 301 determines that the contact-separation mechanism 400 is in the separation state. Note that, the above-mentioned method and structure for the contact-separation detection are taken as an example. The present invention is not limited to the above-mentioned method and structure.

Figure 6D:
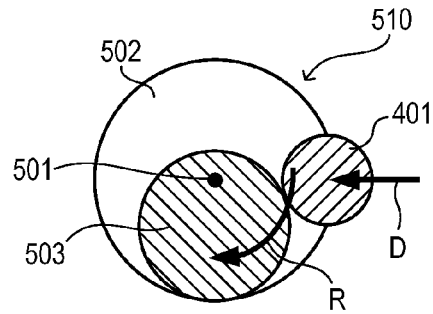

When the contact-separation motor 504 is further driven from the state illustrated in FIG. 6C, the state illustrated in FIG. 6D is obtained. FIG. 6D is an illustration of a state in which the gear 502 is rotated by the contact-separation motor 504 in the direction indicated by the arrow R by 270° from the state of FIG. 6A. The lever member 401 is moved in a direction indicated by the arrow D, which is opposite to the direction indicated by the arrow A, due to self-weights of the primary transfer rollers 105y, 105m, and 105c and the auxiliary roller 205 and biasing forces applied from the springs 209y, 209m, 209c, and 209k.

Figure 6E:
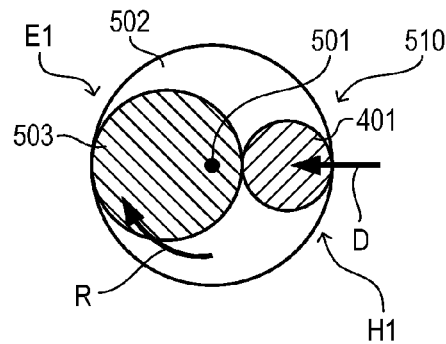

When the contact-separation motor 504 is further driven from the state illustrated in FIG. 6D, the state illustrated in FIG. 6E is obtained. FIG. 6E is an illustration of a state in which the gear 502 is rotated by the contact-separation motor 504 in the direction indicated by the arrow R by 360° from the state of FIG. 6A. The state of FIG. 6E is similar to that of FIG. 6A. The cam portion 503 is located at the position E1 and the lever member 401 is located at the left-end position H1. Accordingly, the intermediate transfer belt 130 returns to the contact state in which the intermediate transfer belt 130 is brought into contact with the photosensitive drums 101y, 101m, 101c, and 101k (full-color photosensitive drums).

Note that, the above-mentioned contact-separation mechanism 400 is taken as an example. The present invention is not limited to the above-mentioned contact-separation mechanism 400. In this way, in the monochrome mode, the contact-separation mechanism 400 is put into the separation state, thereby being capable of reducing abrasion of the surfaces of the photosensitive drums 101y, 101m, and 101c due to friction between the photosensitive drums 101y, 101m, and 101c and the intermediate transfer belt 130. With this, as compared to the case where the intermediate transfer belt 130 is kept in contact with the photosensitive drums 101y, 101m, and 101c, the photosensitive drums 101y, 101m, and 101c can have a longer life. Further, the drive of the drum motors (not shown) corresponding to the photosensitive drums 101y, 101m, and 101c is stopped, thereby being capable of reducing a power consumption amount to achieve the power saving of the image forming apparatus 100.

In the embodiment, when the image formation is completed, the intermediate transfer unit 140 is put into the separation state. Therefore, before the image formation is started in the full-color mode, the intermediate transfer unit 140 is required to be put into the contact state. In the present invention, in the image formation preparing operation to be described later, the intermediate transfer unit 140 is put into the contact state or the separation state in accordance with the color mode before the image formation is started. With this, in the image forming apparatus configured to switch a contact-separation state before the image formation is started, a period of time from the image forming instruction to the start of the image formation is reduced, thereby being capable of reducing a first copy time.

Note that, even when the intermediate transfer unit 140 is put into the separation state at the time of the completion of the image formation, or even when the contact state or the separation state at the time of the image formation is maintained also after the completion of the image formation, a period of time to switch the contact-separation state is required if subsequent image formation is to be performed in a different color mode. Thus, the present invention is not limited to the case of switching the contact-separation state in accordance with the color mode during an image formation waiting state before receiving the image forming instruction. The contact-separation state may be switched in accordance with the color mode set before the image formation is started after receiving the image forming instruction.

[Fixing Temperature Controlling Operation for Fixing Device]

Next, the fixing temperature controlling operation for the fixing device 170 in the full-color mode and the monochrome mode according to the embodiment will be described.

(Fixing Device)

Figure 8:
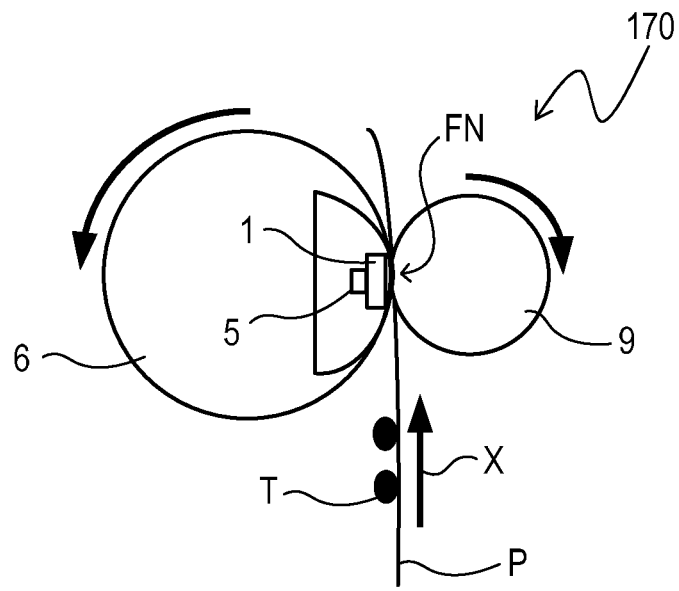
FIG. 8 is a sectional view of a fixing device according to the embodiment.

FIG. 8 is a sectional view of the fixing device 170 according to the embodiment. The fixing device (image heating device) 170 heats and pressurizes the recording medium P having the toner images transferred thereonto, to thereby fix the toner images onto the recording medium P. The fixing device 170 includes a fixing film 6 as a cylindrical metal or resin fixing member, a pressure roller 9, a heater (heating device) 1, and a thermistor (temperature detection device) 5. The pressure roller 9 is rotated by a fixing drive motor (not shown). The pressure roller 9 is arranged so as to be opposed to the heater 1 across the fixing film 6. The pressure roller 9 is held in pressure-contact with a surface of the heater 1 due to a pressing force of, for example, from 49 N to 196 N by a spring (not shown) serving as a biasing member. Along with the rotation drive of the pressure roller 9 in a clockwise direction, the fixing film 6 is driven to rotate in a counter-clockwise direction, which is a forward direction of a conveyance direction X of the recording medium P. The fixing film 6 interposed between the heater 1 and the pressure roller 9 forms a fixing nip portion FN between the fixing film 6 and the pressure roller 9.

The heater 1 is configured to be energized from both ends thereof in a longitudinal direction. A voltage to be applied to the heater 1 is AC 100 V. The heater 1 generates heat in accordance with supplied electric power. In a center portion of the heater 1 in the longitudinal direction, the thermistor 5 is arranged. The thermistor 5 is configured to detect a temperature of the fixing device 170. At the time of the image formation, the CPU 301 changes the electric power supplied to the heater 1 to control the temperature of the fixing device 170 so that the temperature detected by the thermistor 5 becomes a predetermined target temperature (controlled fixing temperature). When the recording medium P bearing unfixed toner images T thereon is conveyed to the fixing nip portion FN, the recording medium P is conveyed while being heated and pressurized at the fixing nip portion FN, and then the unfixed toner images T are fixed onto the recording medium P.

[Image Formation Preparing Operation in Accordance with Color Mode of Image Forming Apparatus]

(Fixing Temperature Controlling Operation in Image Formation Preparing Operation)

Figure 9A:
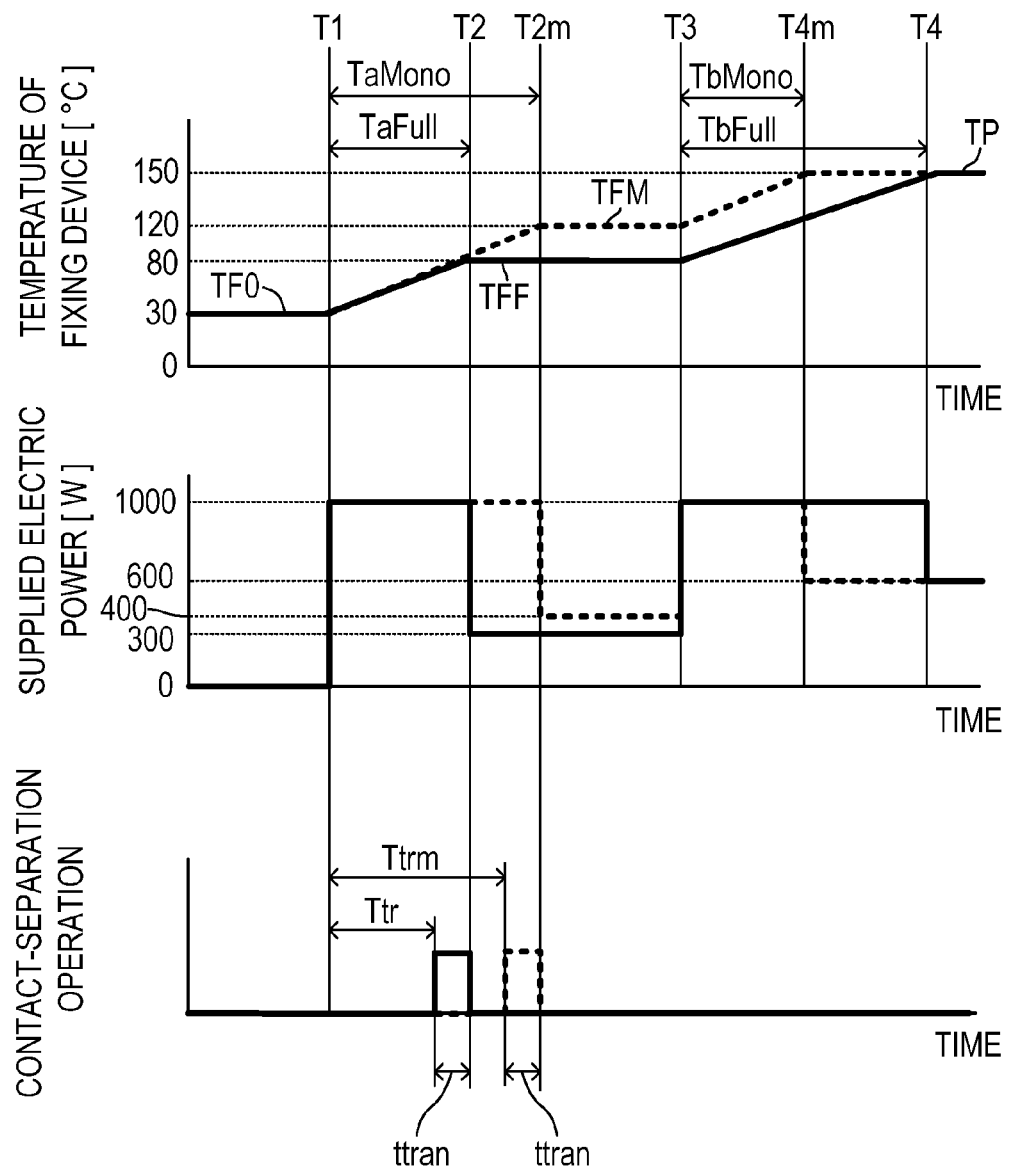
FIG. 9A is a view of a relationship between a temperature of the fixing device and electric power supplied to a heater in a range of from start of an image formation preparing operation to start of image formation.
Figure 9B:
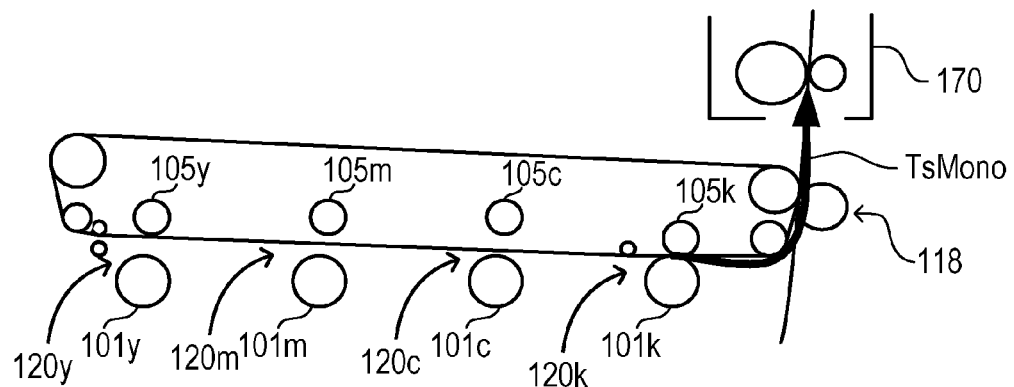
FIG. 9B is a sectional view of a vicinity of a secondary transfer portion in the monochrome mode.
Figure 9C:
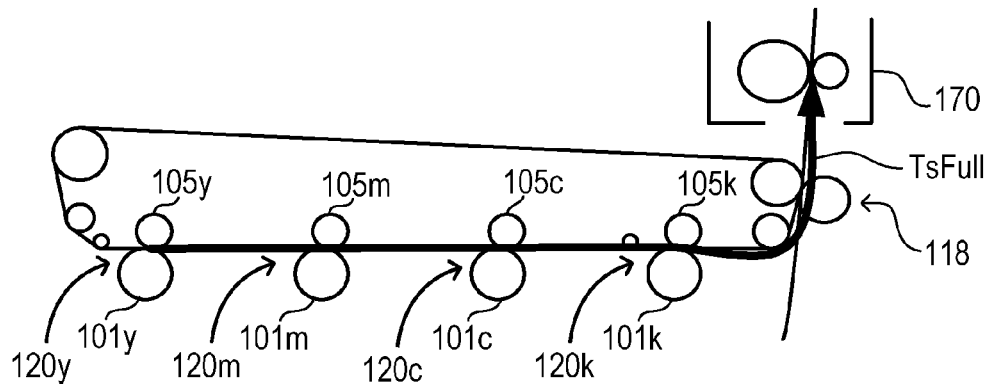
FIG. 9C is a sectional view of the vicinity of the secondary transfer portion in the full-color mode.

FIG. 9A, FIG. 9B, and FIG. 9C are explanatory views of the image formation preparing operation in accordance with each color mode according to the embodiment. The image forming apparatus 100 performs the image formation preparing operation in accordance with each color mode. Referring to FIG. 9A, FIG. 9B, and FIG. 9C, the fixing temperature controlling operation for the fixing device 170 in the image formation preparing operation will be described.

FIG. 9A is an illustration of a relationship between the temperature of the fixing device 170 and the electric power supplied to the heater 1 in a range of from the start of the image formation preparing operation to the start of the image formation. Further, in Table 1, the image formation preparing temperature and an image formation temperature of the fixing device 170 in accordance with each color mode are shown. The color modes include the monochrome mode for forming a monochrome image (single-color image), the full-color mode for forming a full-color image (color image), and the full-color/monochrome automatically discriminating mode. In the full-color/monochrome automatically discriminating mode, the full-color mode or the monochrome mode is determined based on the image of the original read by the original reading portion 200. The image formation preparing temperature is a target temperature for preliminarily heating the fixing device 170 before the image forming apparatus 100 receives the image forming instruction. The image formation temperature is a target temperature (fixing temperature) of the fixing device 170 at the time of the image formation.

TABLE 1

|  | Full-color mode | Monochrome mode Full-color/monochrome automatically discriminating mode |
|---|---|---|
| Image formation preparing temperature | 80° C. | 120° C. |
| Image formation temperature |  | 150° C. |

In the embodiment, in accordance with the color mode set through the UI 330, a controlled temperature of the fixing device 170 is switched to an optimum temperature in the image formation preparing operation. The image formation preparing temperature in the full-color mode (TempFlyingFull; hereinafter referred to as "first controlled temperature TFF") is set to 80° C. as shown in Table 1 in the embodiment. The image formation preparing temperature in the monochrome mode (TempFlyingMono; hereinafter referred to as "second controlled temperature TFM") is set to 120° C. as shown in Table 1 in the embodiment. On the other hand, the image formation temperature (TempPrint; hereinafter referred to as "controlled fixing temperature TP") is set to 150° C. as shown in Table 1 irrespective of the color mode in the embodiment. Note that, in the present invention, the first controlled temperature TFF, the second controlled temperature TFM, and the controlled fixing temperature TP are not limited to the temperatures shown in Table 1, and may be set as appropriate in accordance with the image forming apparatus 100.

Now, referring to FIG. 9A, the fixing temperature controlling operation for the fixing device 170 in the image formation preparing operation will be described. In FIG. 9A, the solid lines indicate the full-color mode, whereas the broken lines indicate the monochrome mode. Even before the user depresses the start key 306 of the UI 330, in response to the detection of the user operation from which the start of the image formation is predicted, the CPU 301 starts the image formation preparing operation in accordance with the set color mode. A time when the image formation preparing operation is started is represented by T1.

At the time T1, the CPU 301 starts supplying electric power to the heater 1. When the color mode stored in the RAM 303 is the full-color mode, the CPU 301 supplies electric power of 1,000 W to the heater 1 until the temperature of the thermistor 5 reaches the first controlled temperature TFF (80° C.). Then, when the temperature of the thermistor 5 reaches the first controlled temperature TFF, the CPU 301 switches to supply electric power of 300 W so that the temperature of the thermistor 5 is maintained to be the first controlled temperature TFF. Specifically, in the full-color mode, the CPU 301 adjusts the temperature of the fixing device 170 to be the first controlled temperature TFF in the image formation preparing operation.

A time when the temperature of the thermistor 5 reaches the first controlled temperature TFF is represented by T2. The time T2 varies depending on the temperature detected by the thermistor 5 (hereinafter referred to as "TF0") at the time T1. In this case, a period of time (T2−T1) taken from the time T1 when the image formation preparing operation is started to the time T2 when the temperature of the thermistor 5 reaches the first controlled temperature TFF is referred to as a preliminary heating time Ta. At the time T1, the CPU 301 obtains the preliminary heating time Ta based on the detected temperature TF0 and the first controlled temperature TFF.

In Table 2, a relationship between a temperature difference between the first controlled temperature TFF or the second controlled temperature TFM and the temperature TF0 detected by the thermistor 5 at the time T1 and the preliminary heating time Ta required for the temperature of the thermistor 5 to reach the first controlled temperature TFF or the second controlled temperature TFM is shown.

TABLE 2

| Temperature difference | Preliminary heating time Ta |
|---|---|
| 0° C. or less | 0 second |
| ... | ... |
| 50° C. | 8 seconds |
| ... | ... |
| 90° C. | 14.4 seconds |
| ... | ... |

In the full-color mode, the temperature difference is a value obtained by subtracting the detected temperature TF0 from the first controlled temperature TFF (temperature difference=first controlled temperature TFF−detected temperature TF0). The CPU 301 obtains the preliminary heating time Ta corresponding to the temperature difference based on Table 2 (the preliminary heating time Ta in the full-color mode is hereinafter referred to as "TaFull"). Assuming the first controlled temperature TFF in the full-color mode is 80° C., for example, the temperature difference is 50° C. (=80° C.−30° C.) when the detected temperature TF0 is 30° C. at the time T1. Thus, the CPU 301 selects 8 seconds as the preliminary heating time TaFull based on Table 2. On the other hand, when the detected temperature TF0 is 90° C. at the time T1, the temperature difference is −10° C. (=80° C.−90° C.), that is, the detected temperature TF0 is already equal to or higher than the first controlled temperature TFF, and hence the CPU 301 selects 0 seconds as the preliminary heating time TaFull based on Table 2. Note that, Table 2 is obtained based on experiments in advance.

Next, when the image forming instruction for commanding the start of the image formation is received, the CPU 301 starts the image formation by the image forming apparatus 100. A time when the image formation is started is represented by T3. At the time T3, the CPU 301 starts supplying electric power of 1,000 W to the heater 1. The CPU 301 continues to supply the electric power of 1,000 W to the heater 1 until the temperature of the fixing device 170 reaches the controlled fixing temperature TP capable of fixing the unfixed toner images onto the recording medium P (150° C.). When the temperature of the fixing device 170 reaches the controlled fixing temperature TP, the CPU 301 switches to supply electric power of 600 W so that the controlled fixing temperature TP is maintained. A time when the temperature of the fixing device 170 reaches the controlled fixing temperature TP is represented by T4. The electric power supply to the heater 1 and a conveyance timing of the recording medium P are set so that the recording medium P having the unfixed toner images T formed thereon reaches the fixing device 170 at the time T4.

At the time T1, when the color mode stored in the RAM 303 is the monochrome mode or the full-color/monochrome automatically discriminating mode, the CPU 301 supplies electric power of 1,000 W to the heater 1 until the temperature of the thermistor 5 reaches the second controlled temperature TFM (120° C.). Then, when the temperature of the thermistor 5 reaches the second controlled temperature TFM, the CPU 301 switches to supply electric power of 400 W so that the temperature of the thermistor 5 is maintained to be the second controlled temperature TFM. Specifically, in the monochrome mode, the CPU 301 adjusts the temperature of the fixing device 170 to be the second controlled temperature TFM in the image formation preparing operation.

A time when the temperature of the thermistor 5 reaches the second controlled temperature TFM is represented by T2m. The time T2m varies depending on the temperature TF0 detected by the thermistor 5 at the time T1. In this case, a period of time (T2m−T1) taken from the time T1 when the image formation preparing operation is started to the time T2m when the temperature of the thermistor 5 reaches the second controlled temperature TFM is referred to as a preliminary heating time Ta. At the time T1, the CPU 301 obtains the preliminary heating time Ta based on the detected temperature TF0 and the second controlled temperature TFM.

In the monochrome mode or the full-color/monochrome automatically discriminating mode, the temperature difference is a value obtained by subtracting the detected temperature TF0 from the second controlled temperature TFM (temperature difference=second controlled temperature TFM−detected temperature TF0). The CPU 301 obtains the preliminary heating time Ta corresponding to the temperature difference based on Table 2 (the preliminary heating time Ta in the monochrome mode or the full-color/monochrome automatically discriminating mode is hereinafter referred to as "TaMono"). Assuming the second controlled temperature TFM in the monochrome mode or the full-color/monochrome automatically discriminating mode is 120° C., for example, the temperature difference is 90° C. (=120° C.−30° C.) when the detected temperature TF0 is 30° C. at the time T1. Thus, the CPU 301 selects 14.4 seconds as the preliminary heating time TaMono based on Table 2. On the other hand, when the detected temperature TF0 is 130° C. at the time T1, the temperature difference is −10° C. (=120° C.−130° C.), that is, the detected temperature TF0 is already equal to or higher than the second controlled temperature TFM, and hence the CPU 301 selects 0 seconds as the preliminary heating time TaMono based on Table 2.

Next, when the image forming instruction is received, the CPU 301 starts the image formation by the image forming apparatus 100 similarly to the case of the full-color mode. At the time T3 when the image formation is started, the CPU 301 starts supplying electric power of 1,000 W to the heater 1. At a time T4m when the temperature of the fixing device 170 reaches the controlled fixing temperature TP (150° C.), the electric power supply to the heater 1 and the conveyance timing of the recording medium P are set so that the recording medium P having the unfixed toner images T formed thereon reaches the fixing device 170.

In general, the image formation preparing temperature is set so that the temperature of the fixing device 170 becomes equal to or higher than the controlled fixing temperature TP for fixing the unfixed toner images T onto the recording medium P at the time (T4 or T4m) when the recording medium P reaches the fixing device 170. As the image formation preparing temperature is set higher, the temperature of the fixing device 170 can reach the controlled fixing temperature TP more quickly. However, when the image formation preparing temperature is set to a higher temperature, higher electric power is required to be supplied so that the higher temperature is maintained, thereby being disadvantageous in terms of the power saving. In view of the above, in the embodiment, the image formation preparing temperature is selected from the first controlled temperature TFF and the second controlled temperature TFM in accordance with the color mode stored in the RAM 303. With this, the temperature of the fixing device 170 can reach the controlled fixing temperature TP at the time (T4 or T4m) when the recording medium P reaches the fixing device 170, and the power saving can be achieved as well.

Next, a relationship between the first controlled temperature TFF and the second controlled temperature TFM will be described.

FIG. 9B and FIG. 9C are sectional views of a vicinity of the secondary transfer portion 118. FIG. 9B is an illustration in the monochrome mode. FIG. 9C is an illustration in the full-color mode. FIG. 9B is an illustration of a period of time TsMono from the time when the image formation is started by the black image forming unit 120k to the time when the recording medium P reaches the fixing device 170. FIG. 9C is an illustration of a period of time TsFull from the time when the image formation is started by the yellow image forming unit 120y to the time when the recording medium P reaches the fixing device 170. As is clearly understood from FIG. 9B and FIG. 9C, the period of time TsFull in the full-color mode is longer than the period of time TsMono in the monochrome mode (TsFull>TsMono).

In the full-color mode, a period of time from the time T3 when the image formation is started to the time T4 when the recording medium P reaches the fixing device 170 is represented by TbFull (FIG. 9A). In the monochrome mode, a period of time from the time T3 when the image formation is started to the time T4m when the recording medium P reaches the fixing device 170 is represented by TbMono (FIG. 9A). It is understood that the period of time TbFull can be set longer than the period of time TbMono based on the above-mentioned relationship of TsFull>TsMono. Thus, according to the embodiment, it is possible to set such a temperature relationship that the first controlled temperature TFF in the full-color mode is smaller than the second controlled temperature TFM in the monochrome mode (TFF<TFM). Accordingly, as compared to the case where the image formation preparing temperature is not switched in accordance with the color mode, the supplied electric power for maintaining the first controlled temperature TFF can be reduced in the full-color mode in the embodiment.

In the embodiment, the image formation preparing temperature (first controlled temperature TFF and second controlled temperature TFM) and the supplied electric power are set to fixed values. However, for example, the image formation preparing temperature (first controlled temperature TFF and second controlled temperature TFM) and the supplied electric power may be changed in accordance with an ambient temperature and a power source voltage.

(Contact-Separation Operation in Image Formation Preparing Operation)

As described above, in the embodiment, the intermediate transfer unit 140 is put into the contact state or the separation state by the contact-separation mechanism 400 in accordance with the color mode during the image formation preparing operation. Next, a timing for switching the intermediate transfer unit 140 to the contact state or the separation state in accordance with the color mode during the image formation preparing operation will be described referring to FIG. 9A.

In the contact-separation operation in the embodiment, a contact-separation operation time ttran required to put the intermediate transfer unit 140 into the separation state from the contact state or into the contact state from the separation state is set to 1 second. However, the contact-separation operation time ttran is not limited to 1 second, and may be set as appropriate in accordance with the contact-separation mechanism 400.

When the color mode stored in the RAM 303 is the full-color mode, the CPU 301 starts the contact-separation operation at a time (T2−ttran) earlier by the contact-separation operation time ttran than the time T2 when the temperature detected by the thermistor 5 reaches the first controlled temperature TFF. In the full-color mode, the CPU 301 puts the intermediate transfer unit 140 into the contact state by the contact-separation mechanism 400. The contact-separation operation is started at the time (T2−ttran), thereby being capable of completing the contact-separation operation at the time T2. Specifically, the contact-separation operation can be completed substantially at the same time when the temperature detected by the thermistor 5 reaches the first controlled temperature TFF.

Whether or not the time (T2−ttran) when the contact-separation operation is started has come is determined based on whether or not the timer value of the timer 291 is larger than a waiting time Ttr (=TaFull−ttran) obtained by subtracting the contact-separation operation time ttran from the preliminary heating time TaFull. Note that, at the time T1 when the image formation preparing operation is started, the CPU 301 immediately starts the contact-separation operation if the time already passes the time (T2−ttran) (Ttr (=TaFull−ttran)<0).

When the color mode stored in the RAM 303 is the monochrome mode, the CPU 301 starts the contact-separation operation at a time (T2m−ttran) earlier by the contact-separation operation time ttran than the time T2m when the temperature detected by the thermistor 5 reaches the second controlled temperature TFM. In the monochrome mode, the CPU 301 puts the intermediate transfer unit 140 into the separation state by the contact-separation mechanism 400. The contact-separation operation is started at the time (T2m−ttran), thereby being capable of completing the contact-separation operation at the time T2m. Specifically, the contact-separation operation can be completed substantially at the same time when the temperature detected by the thermistor 5 reaches the second controlled temperature TFM.

Whether or not the time (T2m−ttran) when the contact-separation operation is started has come is determined based on whether or not the timer value of the timer 291 is larger than a waiting time Ttrm (=TaMono−ttran) obtained by subtracting the contact-separation operation time ttran from the preliminary heating time TaMono. Note that, at the time T1 when the image formation preparing operation is started, the CPU 301 immediately starts the contact-separation operation if the time already passes the time (T2m−ttran) (Ttrm (=TaMono−ttran)<0).

Further, the first controlled temperature TFF and the second controlled temperature TFM are different from each other, and hence the preliminary heating time TaFull and the preliminary heating time TaMono are different from each other in accordance with each color mode. Therefore, the CPU 301 calculates the waiting time Ttr or the waiting time Ttrm again every time the color mode is changed through the UI 330 during the image formation preparing operation.

In this way, at the time T1 when the image formation preparing operation is started, the contact-separation operation is not performed immediately. The contact-separation operation is started so that the contact-separation operation is completed at the time T2 or the time T2m when the temperature of the fixing device 170 reaches the first controlled temperature TFF or the second controlled temperature TFM. Thus, it becomes unnecessary to perform the contact-separation operation every time the color mode is changed through the UI 330 before the temperature of the fixing device 170 reaches the first controlled temperature TFF or the second controlled temperature TFM. Specifically, no matter how many times the color mode may be changed before the time (T2−ttran) or the time (T2m−ttran), it is not necessary to repeatedly perform the contact-separation operation. Thus, the life of the contact-separation mechanism 400 can be enhanced, and noise generated due to the drive of the contact-separation mechanism 400 can be reduced as well.

Note that, when the color mode stored in the RAM 303 is the full-color/monochrome automatically discriminating mode, the contact-separation operation is not performed during the image formation preparing operation.

(Description of Flowchart of Image Formation Preparing Operation)

Figure 10:
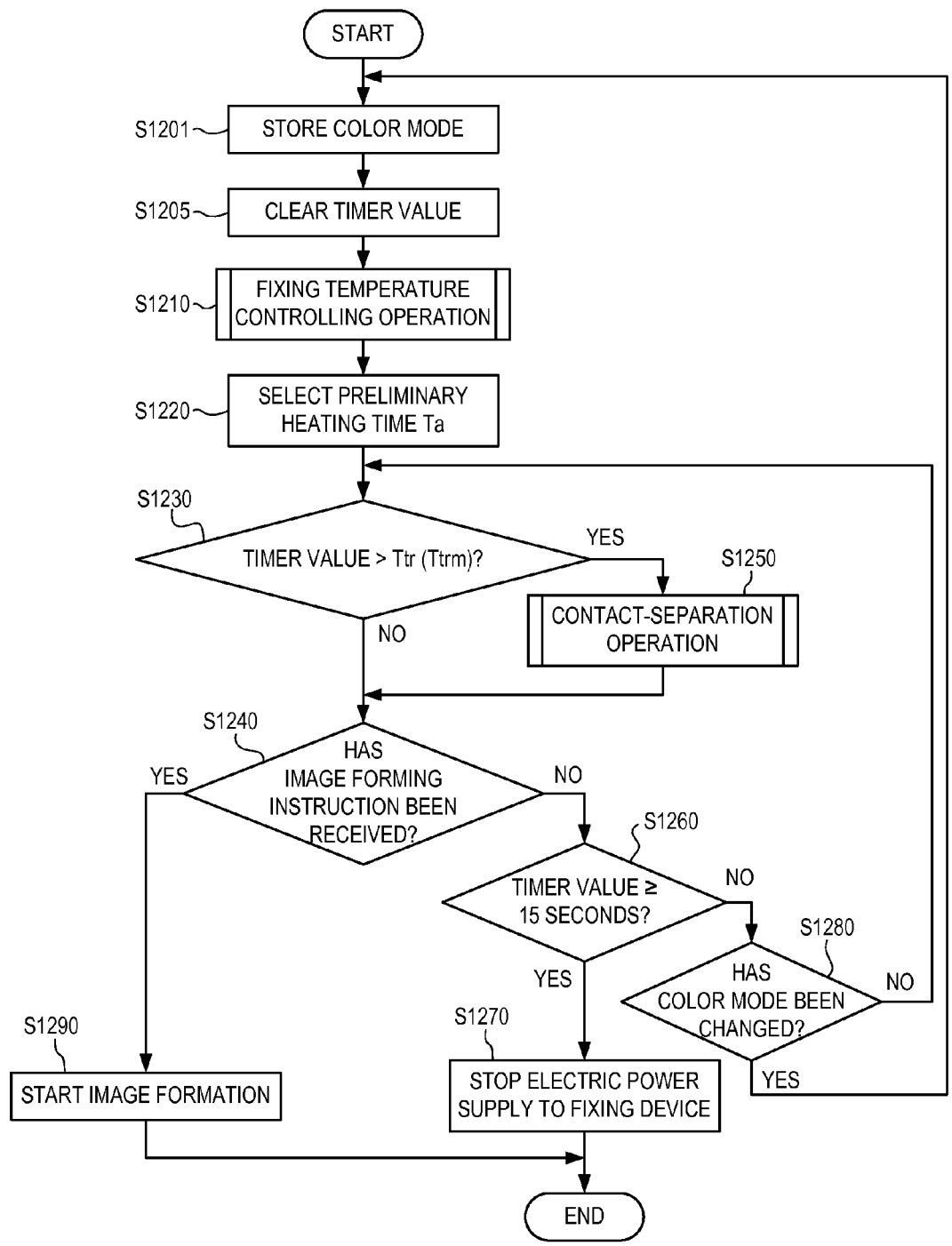
FIG. 10 is a flowchart of the image formation preparing operation according to the embodiment.

Next, referring to FIG. 10, the image formation preparing operation will be described. FIG. 10 is a flowchart of the image formation preparing operation according to the embodiment. When the CPU 301 detects the operation from which the start of the image formation is predicted, the CPU 301 starts the image formation preparing operation in accordance with the color mode. Specifically, when the CPU 301 detects the operation from which the start of the image formation is predicted, such as the key operation for the UI 330, the placement of the original S, or the opening/closing operation for the original pressure cover 53, via the UI 330, the original feeding device control portion 480, or the image reader control portion 280, the CPU 301 starts the image formation preparing operation. First, the color mode set in the UI 330 is stored in the RAM 303 (S1201). The full-color mode, the monochrome mode, or the full-color/monochrome automatically discriminating mode set in the UI 330 is stored in the RAM 303 as the set color mode. In the embodiment, when the power source is turned ON, the full-color mode is stored in the RAM 303 as a default value. Note that, in order to determine whether or not the color mode is changed during the image formation preparing operation, the CPU 301 stores the color mode set through the UI 330 in the RAM 303 every time the color mode is changed through the UI 330 during the image formation preparing operation.

After the color mode is stored in the RAM 303 (S1201), the CPU 301 clears the count value of the timer 291 (hereinafter referred to as "timer value") to 0 (S1205). The timer 291 starts counting time from 0. Note that, the timer 291 constantly adds 1 to the timer value per millisecond. The CPU 301 acquires the timer value of the timer 291, thereby being capable of determining a period of time elapsed from the time T1 when the image formation preparing operation is started (time of zero-clear).

Next, a fixing temperature controlling operation subroutine is performed (S1210). Although the details will be described later, in the fixing temperature controlling operation subroutine, electric power is supplied to the fixing device 170 in accordance with the color mode stored in the RAM 303 as described referring to FIG. 9A. With this, the temperature of the fixing device 170 is raised up to the image formation preparing temperature (first controlled temperature TFF or second controlled temperature TFM).

Next, based on Table 2, the CPU 301 selects the preliminary heating time Ta (TaFull or TaMono) required until the temperature of the fixing device 170 reaches the image formation preparing temperature (first controlled temperature TFF or second controlled temperature TFM) (S1220). At this time point, the timer value of the timer 291 is 0, and hence the time at which the timer value of the timer 291 reaches the preliminary heating time Ta is the time T2 or the time T2$m$ when the temperature of the fixing device 170 reaches the image formation preparing temperature.

Next, the CPU 301 determines a timing of the contact-separation operation for causing the primary transfer rollers 105 to be brought into contact with or separated from the photosensitive drums 101. As illustrated in FIG. 9A, when the temperature of the fixing device 170 reaches the first controlled temperature TFF or the second controlled temperature TFM, the contact-separation operation for the intermediate transfer unit 140 is completed. Specifically, the CPU 301 determines whether or not the timer value of the timer 291 is larger than the waiting time Ttr or the waiting time Ttrm obtained by subtracting the contact-separation operation time ttran from the preliminary heating time TaFull or the preliminary heating time TaMono (S1230). When the timer value is larger than the waiting time Ttr or the waiting time Ttrm (YES in S1230), the CPU 301 performs the contact-separation operation (S1250). Although the details will be described later, in the contact-separation operation, the CPU 301 changes the contact state or the separation state of the intermediate transfer unit 140 in accordance with the color mode stored in the RAM 303.

Next, the CPU 301 determines whether or not the image forming instruction has been received (S1240). When the image forming instruction is received (YES in S1240), the CPU 301 starts the image formation (S1290). When the image forming instruction is not received (NO in S1240), the CPU 301 determines whether or not the period of time elapsed from the start of the image formation preparing operation is equal to or larger than a predetermined period of time. Specifically, the CPU 301 determines whether or not the timer value of the timer 291 is equal to or larger than 15 seconds (S1260). When the timer value is equal to or larger than 15 seconds (YES in S1260), it is likely that the user is not to perform the image forming instruction, and hence the electric power supply to the fixing device 170 is stopped (S1270) to end the image formation preparing operation. Note that, a value other than 15 seconds may be used as a threshold of the timer value. On the other hand, when the timer value is smaller than 15 seconds (NO in S1260), the CPU 301 determines whether or not the color mode set through the UI 330 has been changed (S1280). When the color mode stored in the RAM 303 and the color mode set in the UI 330 do not match each other, the CPU 301 determines that the color mode has been changed. When the color mode is changed (YES in S1280), the processing returns to S1201, and the CPU 301 repeats the image formation preparing operation. When the color mode is not changed (NO in S1280), the processing returns to S1230, and the CPU 301 repeats determining whether or not the contact-separation operation is performed (S1230) and whether or not the image forming instruction has been received (S1240). When the image forming instruction is received, the image formation is started (S1290).

(Description of Flowchart of Fixing Temperature Controlling Operation)

Figure 11:
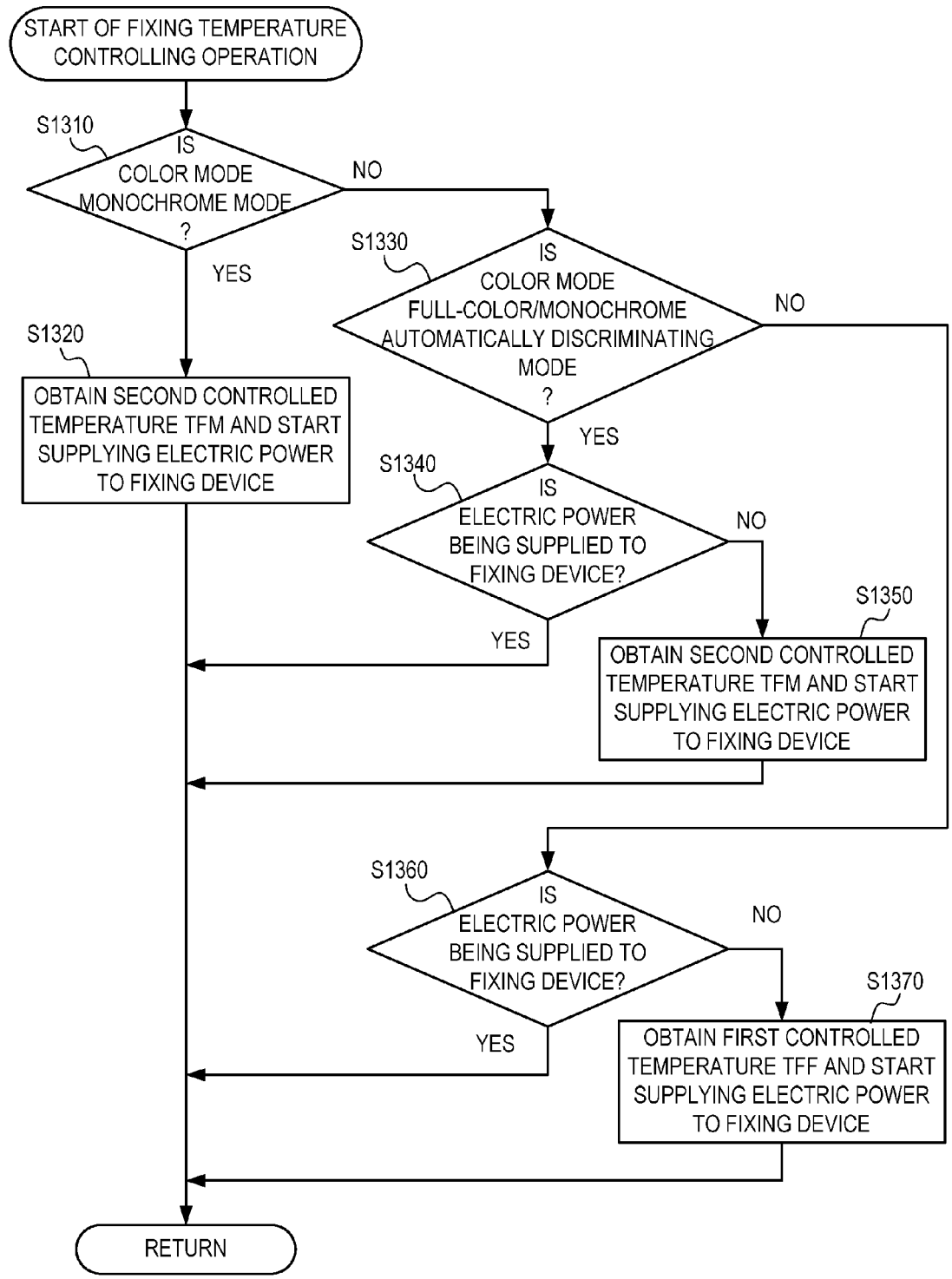
FIG. 11 is a flowchart of a fixing temperature controlling operation according to the embodiment.

Next, referring to FIG. 11, the fixing temperature controlling operation will be described. FIG. 11 is a flowchart of the fixing temperature controlling operation according to the embodiment. The flowchart of FIG. 11 is an illustration of the fixing temperature controlling operation subroutine in S1210 of FIG. 10. First, the CPU 301 determines whether or not the color mode stored in the RAM 303 is the monochrome mode (S1310). When the color mode is the monochrome mode (YES in S1310), the CPU 301 obtains the second controlled temperature TFM in the monochrome mode, and then starts supplying electric power to the fixing device 170 (S1320). After that, the CPU 301 ends the fixing temperature controlling operation subroutine. Note that, for example, when the image formation preparing operation is already started at the first controlled temperature TFF and the color mode is then switched from the full-color mode to the monochrome mode through the UI 330, the CPU 301 switches the first controlled temperature TFF to the second controlled temperature TFM.

When the color mode stored in the RAM 303 is not the monochrome mode (NO in S1310), the CPU 301 determines whether or not the color mode stored in the RAM 303 is the full-color/monochrome automatically discriminating mode (S1330). When the color mode stored in the RAM 303 is the full-color/monochrome automatically discriminating mode (YES in S1330), the CPU 301 determines whether or not electric power is being supplied to the fixing device 170 (S1340).

When electric power is being supplied to the fixing device 170 (YES in S1340), the fixing temperature controlling operation subroutine is ended without changing the image formation preparing temperature (first controlled temperature TFF or second controlled temperature TFM). Specifically, when the fixing temperature controlling operation is being performed, the fixing temperature controlling operation is continued as it is in accordance with the performed color mode. The reason is as follows. In the full-color/monochrome automatically discriminating mode, the image signal control portion 281 discriminates whether or not the image of the original read by the image sensor 233 after the start of the image formation is the monochrome image. Then, when the image signal control portion 281 discriminates that the image of the original is the monochrome image, the CPU 301 performs the image formation in the monochrome mode. When the image signal control portion 281 discriminates that the image of the original is not the monochrome image, the CPU 301 performs the image formation in the full-color mode. Therefore, the CPU 301 cannot determine in which color mode out of the full-color mode and the monochrome mode the image formation preparing operation may be appropriately performed during the image formation preparing operation. Thus, when electric power is being supplied to the fixing device 170 in the full-color/monochrome automatically discriminating mode, the CPU 301 does not change the image formation preparing temperature (first controlled temperature TFF or second controlled temperature TFM).

When electric power is not being supplied to the fixing device 170 (NO in S1340), the CPU 301 obtains the second controlled temperature TFM in the monochrome mode, and then starts supplying electric power to the fixing device 170 (S1350). Specifically, when the fixing temperature controlling operation is not being performed, the image formation preparing operation is started in accordance with the monochrome mode. After that, the CPU 301 ends the fixing temperature controlling operation subroutine. The reason is as follows. When the temperature of the fixing device 170 is the second controlled temperature TFM in the monochrome mode, the period of time to reach the controlled fixing temperature TP from the image forming instruction is short, thereby being capable of reducing an operation stopping time. Note that, when the image formation preparing operation is performed in the full-color mode, the color mode may be changed to the full-color/monochrome automatically discriminating mode. In such a case, when the image of the original is determined to be the monochrome image so that the image formation is started in the monochrome mode after the image formation preparing operation is completed in the full-color mode, the image formation is started after the temperature of the fixing device 170 reaches the second controlled temperature TFM in the monochrome mode.

When the color mode stored in the RAM 303 is not the full-color/monochrome automatically discriminating mode (NO in S1330), that is, the color mode is the full-color mode, the CPU 301 determines whether or not electric power is being supplied to the fixing device 170 (S1360). When electric power is being supplied to the fixing device 170 (YES in S1360), the CPU 301 ends the fixing temperature controlling operation subroutine without changing the image formation preparing temperature (first controlled temperature TFF or second controlled temperature TFM). As illustrated in FIG. 9A, the second controlled temperature TFM in the monochrome mode is closer to the controlled fixing temperature TP at the time of the image formation than the first controlled temperature TFF in the full-color mode. Therefore, when electric power is already supplied to the fixing device 170 to reach the second controlled temperature TFM but the image formation preparing temperature is lowered to the first controlled temperature TFF, the electric power consumed to reach the second controlled temperature TFM may result in waste. On the other hand, when electric power is already supplied to the fixing device 170 to reach the first controlled temperature TFF in the full-color mode, the image formation preparing temperature is not required to be switched. Accordingly, the CPU 301 does not change the image formation preparing temperature (first controlled temperature TFF or second controlled temperature TFM).

When electric power is not being supplied to the fixing device 170 (NO in S1360), the CPU 301 obtains the first controlled temperature TFF in the full-color mode, and then starts supplying electric power to the fixing device 170 (S1370). After that, the CPU 301 ends the fixing temperature controlling operation subroutine.

(Description of Flowchart of Contact-Separation Operation)

Figure 12:
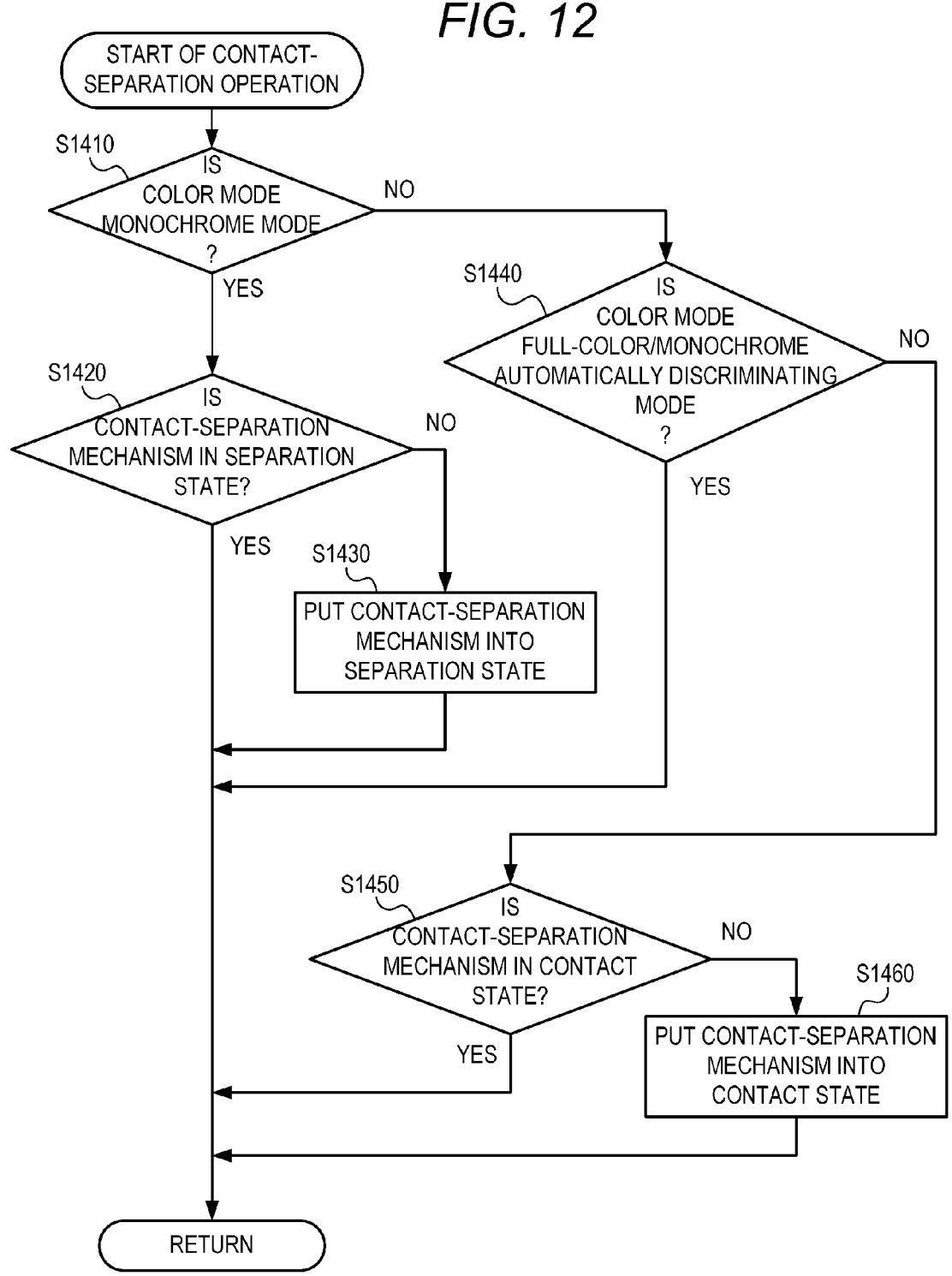
FIG. 12 is a flowchart of a contact-separation operation according to the embodiment.

Next, referring to FIG. 12, the contact-separation operation will be described. FIG. 12 is a flowchart of the contact-separation operation according to the embodiment. The flowchart of FIG. 12 is an illustration of the contact-separation operation subroutine in S1250 of FIG. 10. First, the CPU 301 determines whether or not the color mode stored in the RAM 303 is the monochrome mode (S1410). When the color mode is the monochrome mode (YES in S1410), the CPU 301 determines whether or not the contact-separation mechanism 400 is in the separation state (S1420). When the contact-separation mechanism 400 is in the separation state (YES in S1420), the CPU 301 ends the contact-separation operation subroutine. When the contact-separation mechanism 400 is not in the separation state (NO in S1420), as described referring to FIG. 4A, FIG. 4B, FIG. 5A, FIG. 5B, FIG. 6A, FIG. 6B, FIG. 6C, FIG. 6D, FIG. 6E, FIG. 7A, and FIG. 7B, the contact-separation mechanism 400 is put into the separation state from the contact state (S1430). After that, the CPU 301 ends the contact-separation operation subroutine.

When the color mode stored in the RAM 303 is not the monochrome mode (NO in S1410), the CPU 301 determines whether or not the color mode stored in the RAM 303 is the full-color/monochrome automatically discriminating mode (S1440). When the color mode is the full-color/monochrome automatically discriminating mode (YES in S1440), the CPU 301 ends the contact-separation operation subroutine without changing the contact state or the separation state of the contact-separation mechanism 400. This is because, as described above, in the full-color/monochrome automatically discriminating mode, the CPU 301 cannot determine in which color mode out of the full-color mode and the monochrome mode the image formation preparing operation may be appropriately performed during the image formation preparing operation.

When the color mode stored in the RAM 303 is not the full-color/monochrome automatically discriminating mode (NO in S1440), that is, the color mode is the full-color mode, the CPU 301 determines whether or not the contact-separation mechanism 400 is in the contact state (S1450). When the contact-separation mechanism 400 is in the contact state (YES in S1450), the CPU 301 ends the contact-separation operation subroutine. When the contact-separation mechanism 400 is not in the contact state (NO in S1450), the contact-separation mechanism 400 is put into the contact state (S1460). After that, the CPU 301 ends the contact-separation operation subroutine.

Note that, in the embodiment, when the CPU 301 detects the opening/closing operation for the original pressure cover 53, the placement of the original, or the key operation for the UI 330, the CPU 301 starts the image formation preparing operation. However, the present invention is not limited thereto. The CPU 301 may start the image formation preparing operation in accordance with the color mode when detecting, for example, the opening/closing operation for the sheet feeding cassette 111, the placement of the recording media P on the manual feeding tray 141, print condition settings through the external I/F 282, or approach of the user through a human sensor.

Further, when the image formation only in the monochrome mode is permitted while prohibiting the full-color mode due to shortage of the yellow, magenta, or cyan toner of the image forming apparatus 100 or the like, the image formation preparing operation in the monochrome mode may be performed without performing the image formation preparing operation in the full-color mode. Alternatively, irrespective of the color mode set through the UI 330, the image formation preparing operation may be started in the monochrome mode.

As described above, according to the embodiment, the image formation preparing operation is switched in accordance with the color mode set through the operating portion of the image forming apparatus 100. Thus, an optimum image formation preparing operation for the set color mode can be performed. For example, the image formation preparing temperature of the fixing device 170 is set to an appropriate value in accordance with the color mode in the image formation preparing operation, thereby being capable of achieving the power saving. Further, before receiving the image forming instruction, the contact-separation mechanism 400 of the intermediate transfer unit 140 may be put into the contact state or the separation state in accordance with the color mode. Thus, the intermediate transfer unit 140 is put into the contact state or the separation state before the image formation is started, thereby being capable of preventing the first copy time from becoming long. Accordingly, the first copy time can be shortened.

According to the embodiment, the image formation preparing operation can be started in accordance with the color mode set through the operating portion of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-144860, filed Jul. 15, 2014, which is hereby incorporated by reference herein in its entirety.

What is claimed is:

1. An image forming apparatus, comprising:
a first photosensitive drum on which a color toner image is to be formed;
a second photosensitive drum on which a black toner image is to be formed;
an intermediate transfer member onto which the color toner image and the black toner image are to be transferred;
a transfer portion configured to transfer, onto a sheet, a toner image transferred on the intermediate transfer member;
a fixing unit configured to fix, onto the sheet, the toner image transferred on the sheet;
a mechanism configured to switch the intermediate transfer member between a first state in which the intermediate transfer member is in contact with the first photosensitive drum and the second photosensitive drum and a second state in which the intermediate transfer member is separated from the first photosensitive drum and in contact with the second photosensitive drum;
an operating portion configured to receive a user instruction including an instruction of image formation and an instruction of setting of a color mode;
a detection portion configured to detect a user operation from which a start of the image formation is predicted; and
a control portion configured to:
control, in response to detection of the user operation by the detection portion, the mechanism in accordance with the set color mode without waiting to receive the instruction of the image formation; and
start the image formation in response to the instruction of the image formation,
wherein the color mode includes a full-color mode and a monochrome mode, and
wherein the control portion is configured to:
control the mechanism so that the intermediate transfer member is put into the first state when the full-color mode is set;
control the mechanism so that the intermediate transfer member is put into the second state when the monochrome mode is set; and
control, when the color mode is changed in response to the instruction of the setting of the color mode before receiving the instruction of the image formation and after controlling the mechanism in accordance with the set color mode, the mechanism in accordance with a changed color mode.

2. An image forming apparatus according to claim 1,
wherein the control portion starts an image formation preparing operation in response to the detection of the user operation by the detection portion, and
wherein the control portion controls the mechanism in accordance with the set color mode before receiving the instruction of the image formation and after an elapse of a predetermined period of time from a start of the image formation preparing operation.

3. An image forming apparatus according to claim 2,
wherein the image formation preparing operation comprises a fixing temperature controlling operation for the fixing unit, and
wherein the predetermined period of time is set in accordance with the fixing temperature controlling operation.

4. An image forming apparatus according to claim 3,
wherein the fixing temperature controlling operation is performed in accordance with a temperature corresponding to the set color mode.

5. An image forming apparatus according to claim 1,
wherein the first photosensitive drum comprises at least one of a photosensitive drum on which a yellow toner image is to be formed, a photosensitive drum on which a magenta toner image is to be formed, and a photosensitive drum on which a cyan toner image is to be formed.

6. An image forming apparatus, comprising:
a first photosensitive drum on which a color toner image is to be formed;
a second photosensitive drum on which a black toner image is to be formed;
an intermediate transfer member onto which the color toner image and the black toner image are to be transferred;
a transfer portion configured to transfer, onto a sheet, a toner image transferred on the intermediate transfer member;
a fixing unit configured to fix, onto the sheet, the toner image transferred on the sheet;
a mechanism configured to switch the intermediate transfer member between a first state in which the intermediate transfer member is in contact with the first photosensitive drum and the second photosensitive drum and a second state in which the intermediate transfer member is separated from the first photosensitive drum and in contact with the second photosensitive drum;
an operating portion configured to receive a user instruction including an instruction of image formation and an instruction of setting of a color mode;
a detection portion configured to detect a user operation from which a start of the image formation is predicted; and
a control portion configured to:
perform an image formation preparing operation in response to detection of the user operation by the detection portion;
control, in response to the detection of the user operation by the detection portion, the mechanism in accordance with the set color mode after an elapse of a predetermined period of time from a start of the image formation preparing operation without waiting to receive the instruction of the image formation; and
start the image formation in response to the instruction of the image formation,
wherein the color mode includes a full-color mode and a monochrome mode, and
wherein the control portion is configured to:
control the mechanism so that the intermediate transfer member is put into the first state when the full-color mode is set; and
control the mechanism so that the intermediate transfer member is put into the second state when the monochrome mode is set.

7. An image forming apparatus according to claim 6,
wherein the control portion starts the image formation preparing operation in response to the detection of the user operation by the detection portion, and wherein the control portion controls the mechanism in accordance with the set color mode before receiving the instruction of the image formation and after the elapse of the predetermined period of time from the start of the image formation preparing operation.

8. An image forming apparatus according to claim 7, wherein the image formation preparing operation comprises a fixing temperature controlling operation for the fixing unit, and wherein the predetermined period of time is set in accordance with the fixing temperature controlling operation.

9. An image forming apparatus according to claim 8, wherein the fixing temperature controlling operation is performed in accordance with a temperature corresponding to the set color mode.

10. An image forming apparatus according to claim 6, wherein the first photosensitive drum comprises at least one of a photosensitive drum on which a yellow toner image is to be formed, a photosensitive drum on which a magenta toner image is to be formed, and a photosensitive drum on which a cyan toner image is to be formed.

\* \* \* \* \*